(12) United States Patent
Tsuge et al.

(10) Patent No.: US 11,122,667 B2
(45) Date of Patent: Sep. 14, 2021

(54) FLOODLIGHT

(71) Applicant: MAKITA CORPORATION, Anjo (JP)

(72) Inventors: Kazunori Tsuge, Anjo (JP); Koji Takahashi, Anjo (JP); Kosuke Komiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/628,229

(22) PCT Filed: Jul. 10, 2018

(86) PCT No.: PCT/JP2018/026091
§ 371 (c)(1),
(2) Date: Jan. 2, 2020

(87) PCT Pub. No.: WO2019/017249
PCT Pub. Date: Jan. 24, 2019

(65) Prior Publication Data
US 2021/0140620 A1    May 13, 2021

(30) Foreign Application Priority Data

Jul. 18, 2017   (JP) .............................. JP2017-139395

(51) Int. Cl.
*H05B 45/56*        (2020.01)
*H05B 47/10*        (2020.01)
(Continued)

(52) U.S. Cl.
CPC ................ *H05B 45/56* (2020.01); *F21S 9/02* (2013.01); *F21V 23/005* (2013.01); *F21V 29/61* (2015.01);
(Continued)

(58) Field of Classification Search
CPC . F21V 29/677; F21V 29/61; F21S 9/02; F21S 23/005; F21W 2131/1005
See application file for complete search history.

(56) References Cited

U.S. PATENT DOCUMENTS

2006/0120084 A1    6/2006  Sueoka
2009/0135604 A1*   5/2009  Chen ........................ F21V 29/83
                                                          362/294
2009/0244897 A1   10/2009  Anglikowski et al.

FOREIGN PATENT DOCUMENTS

CN      202001849 U    10/2011
CN      104864304 A     8/2015
(Continued)

OTHER PUBLICATIONS

Oct. 16, 2018 Search Report issued in International Patent Application No. PCT/JP2018/026091.
(Continued)

*Primary Examiner* — Anne M Hines
(74) *Attorney, Agent, or Firm* — Oliff PLC

(57) ABSTRACT

A floodlight includes a light source, a support member that supports the light source, and a fan that cools the light source by generating an air flow on a surface of the support member. The light source is supported on a front face of the support member and emits light forward with respect to the support member. The fan is disposed rearward of the support member, at a position facing the support member.

26 Claims, 25 Drawing Sheets

(51) Int. Cl.
  *H05B 47/165* (2020.01)
  *F21V 29/61* (2015.01)
  *F21V 29/67* (2015.01)
  *F21S 9/02* (2006.01)
  *F21V 23/00* (2015.01)
  *F21W 131/10* (2006.01)

(52) U.S. Cl.
  CPC ........... *F21V 29/677* (2015.01); *H05B 47/10* (2020.01); *H05B 47/165* (2020.01); *F21W 2131/1005* (2013.01)

(56) References Cited

FOREIGN PATENT DOCUMENTS

| | | |
|---|---|---|
| CN | 205048289 U | 2/2016 |
| CN | 205261354 U | 5/2016 |
| CN | 106678653 A | 5/2017 |
| JP | 2006-128035 A | 5/2006 |
| JP | 2006-162653 A | 6/2006 |
| JP | 2010-049830 A | 3/2010 |
| JP | 2010-97915 A | 4/2010 |
| JP | 2013-168292 A | 8/2013 |
| JP | 2013-187081 A | 9/2013 |
| JP | 2014-212025 A | 11/2014 |
| JP | 2014-212062 A | 11/2014 |
| JP | 2016-154127 A | 8/2016 |

OTHER PUBLICATIONS

Oct. 20, 2020 Office Action issued in Japanese Patent Application No. 2019-530983.
Mar. 2, 2021 Office Action issued in Japanese Patent Application No. 2019-530983.
Apr. 22, 2021 Office Action issued in Chinese Patent Application No. 201880045435.4.
Jun. 29, 2021 Office Action issued in Japanese Patent Application No. 2019-530983.

\* cited by examiner

FIG.1
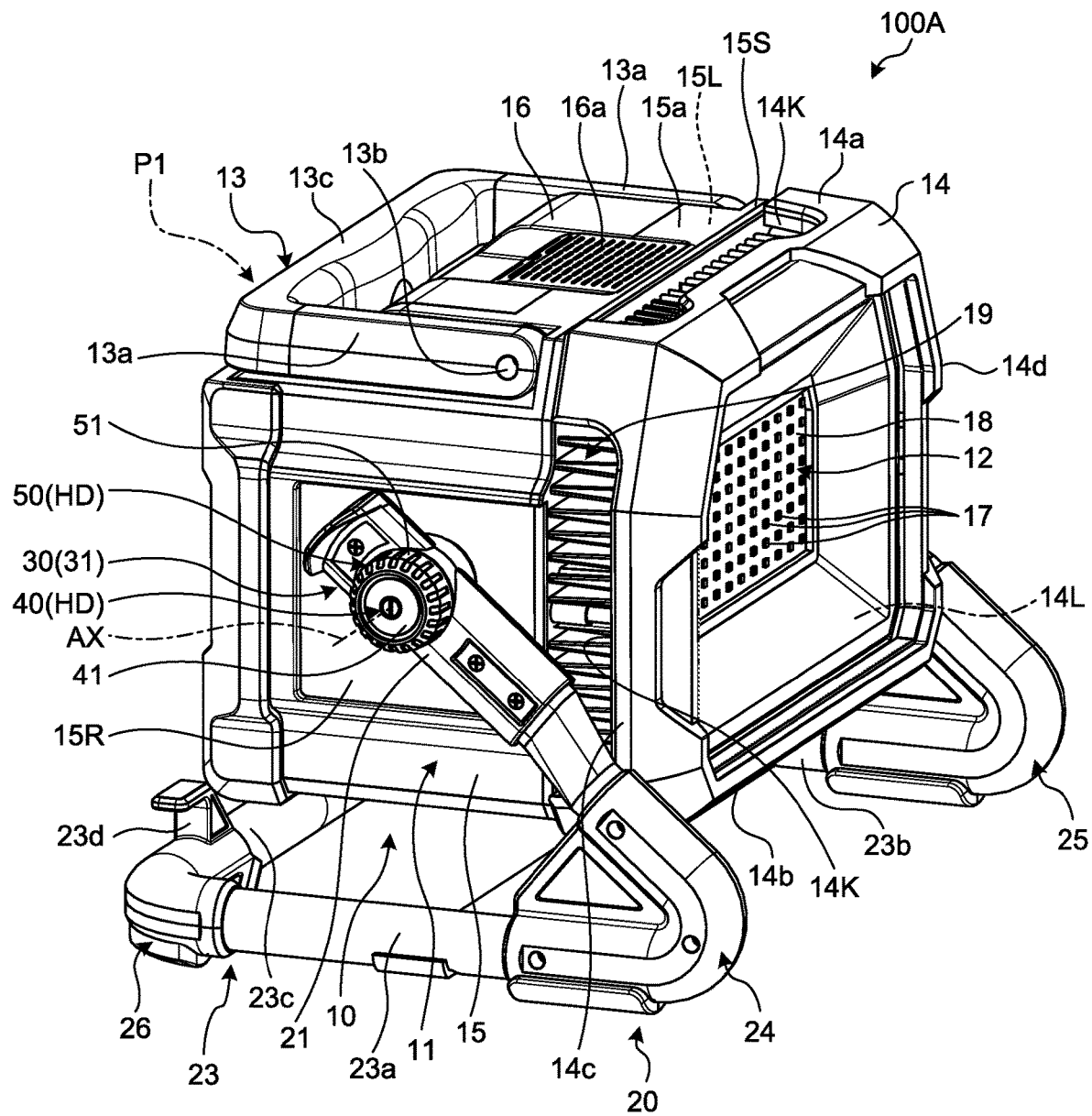
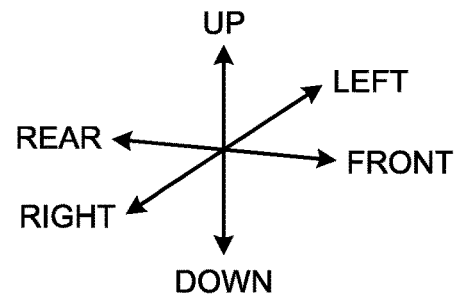

FIG.2
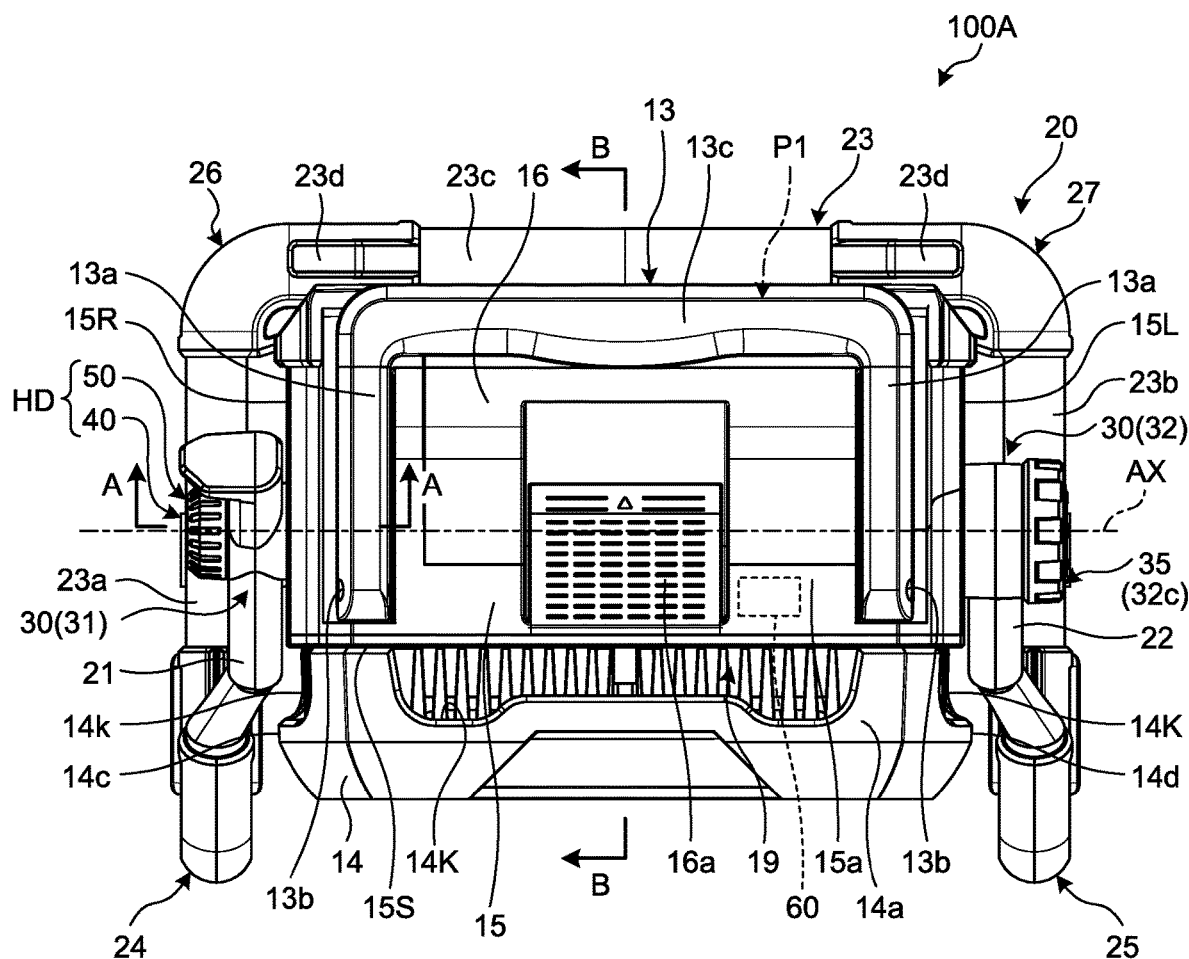
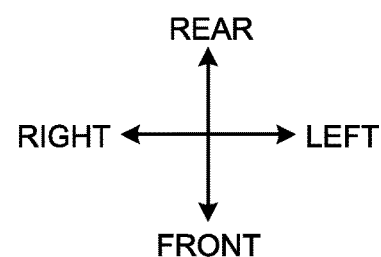

FIG.4
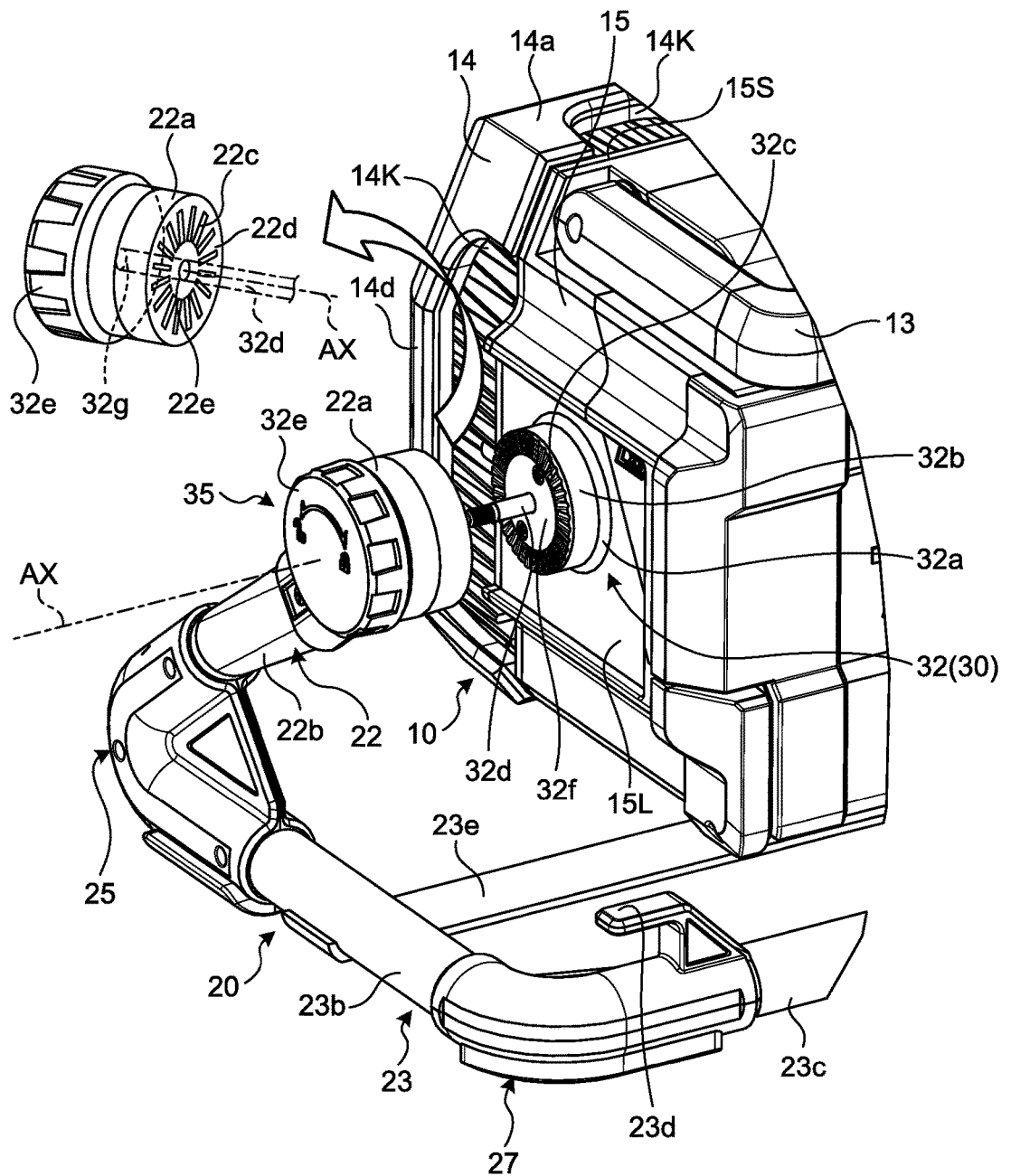
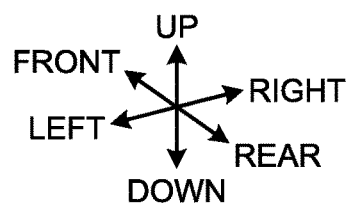

FIG.19
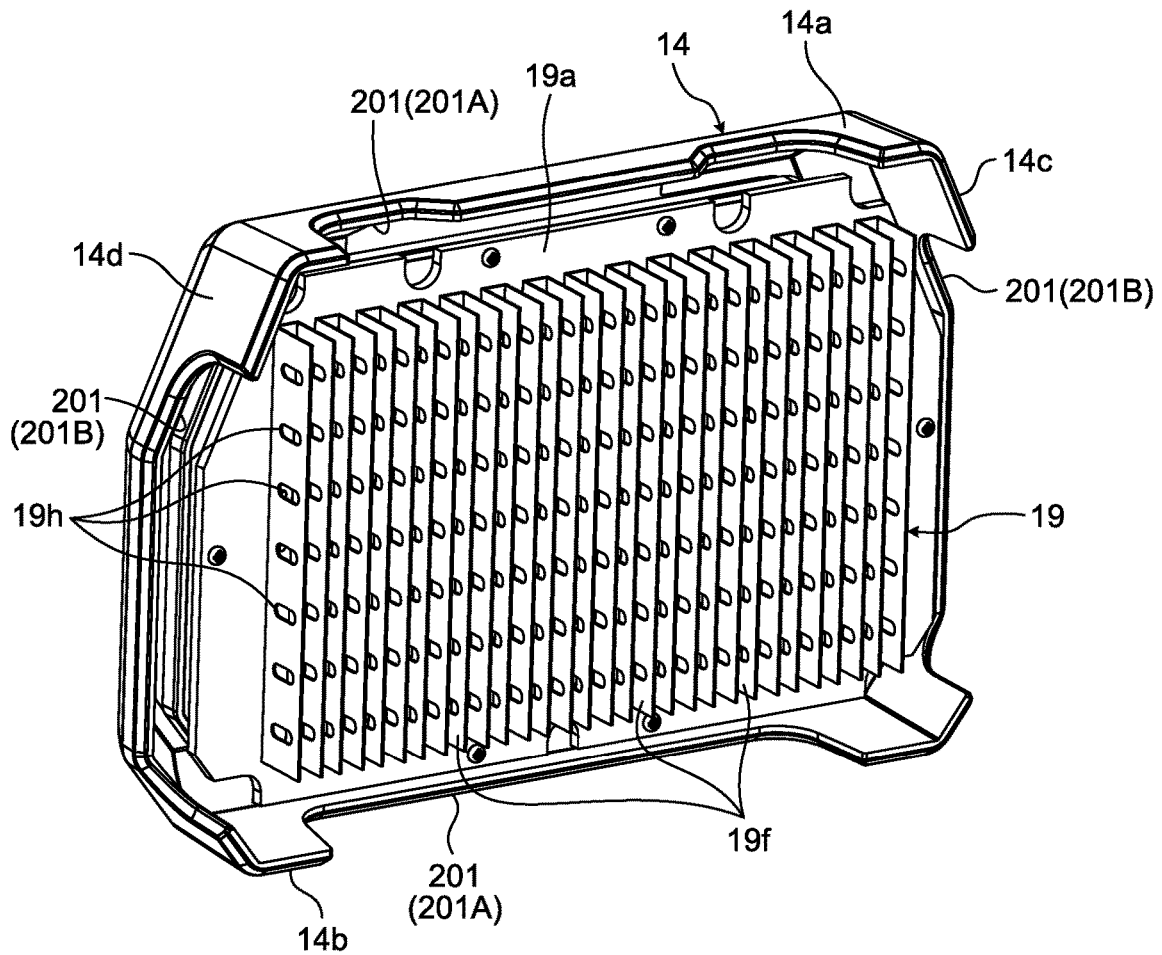
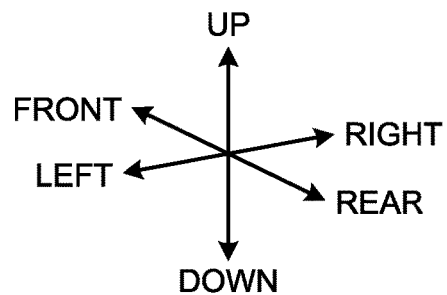

FIG.23
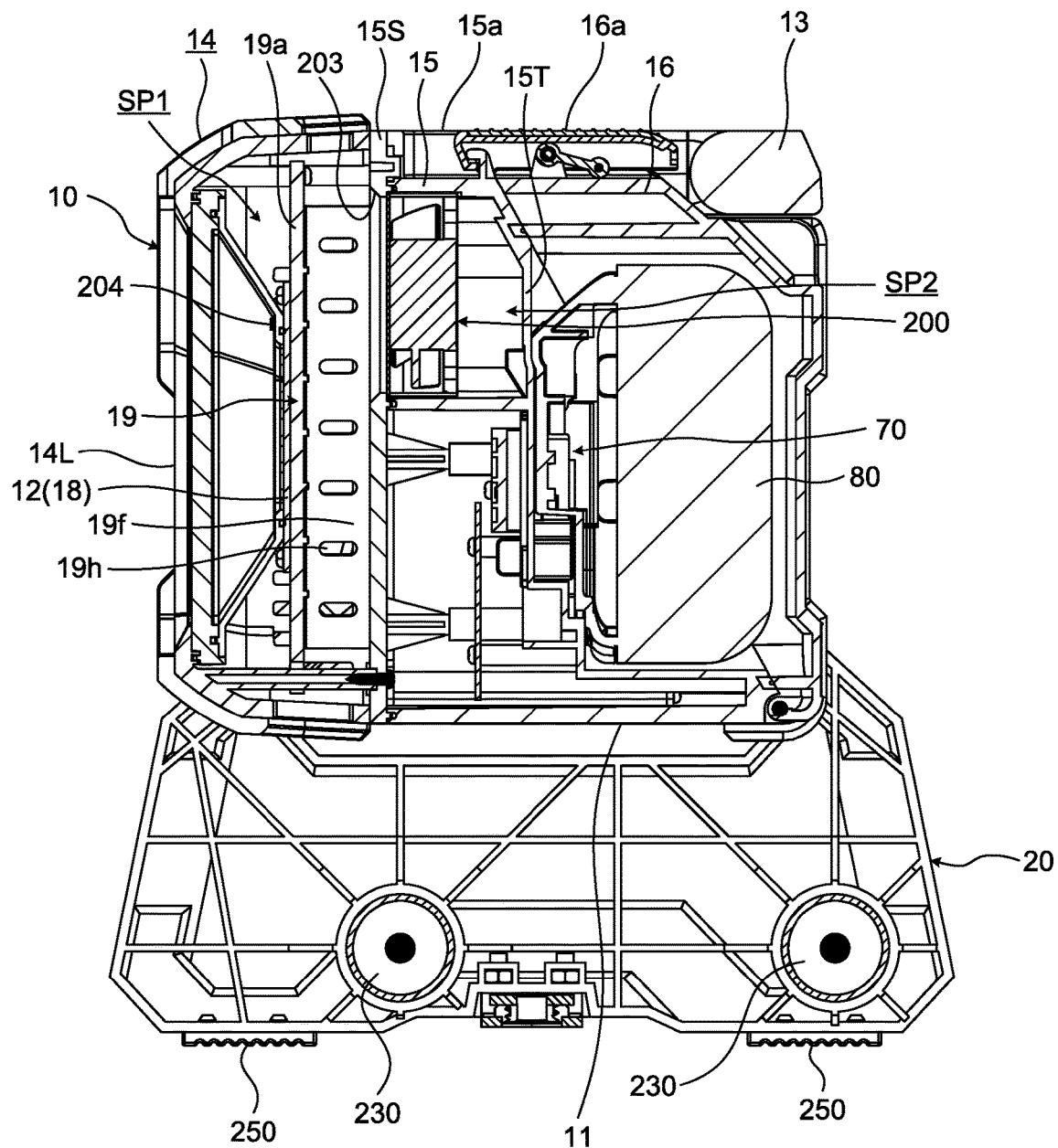
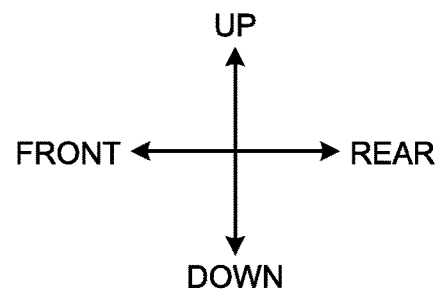

FIG.25
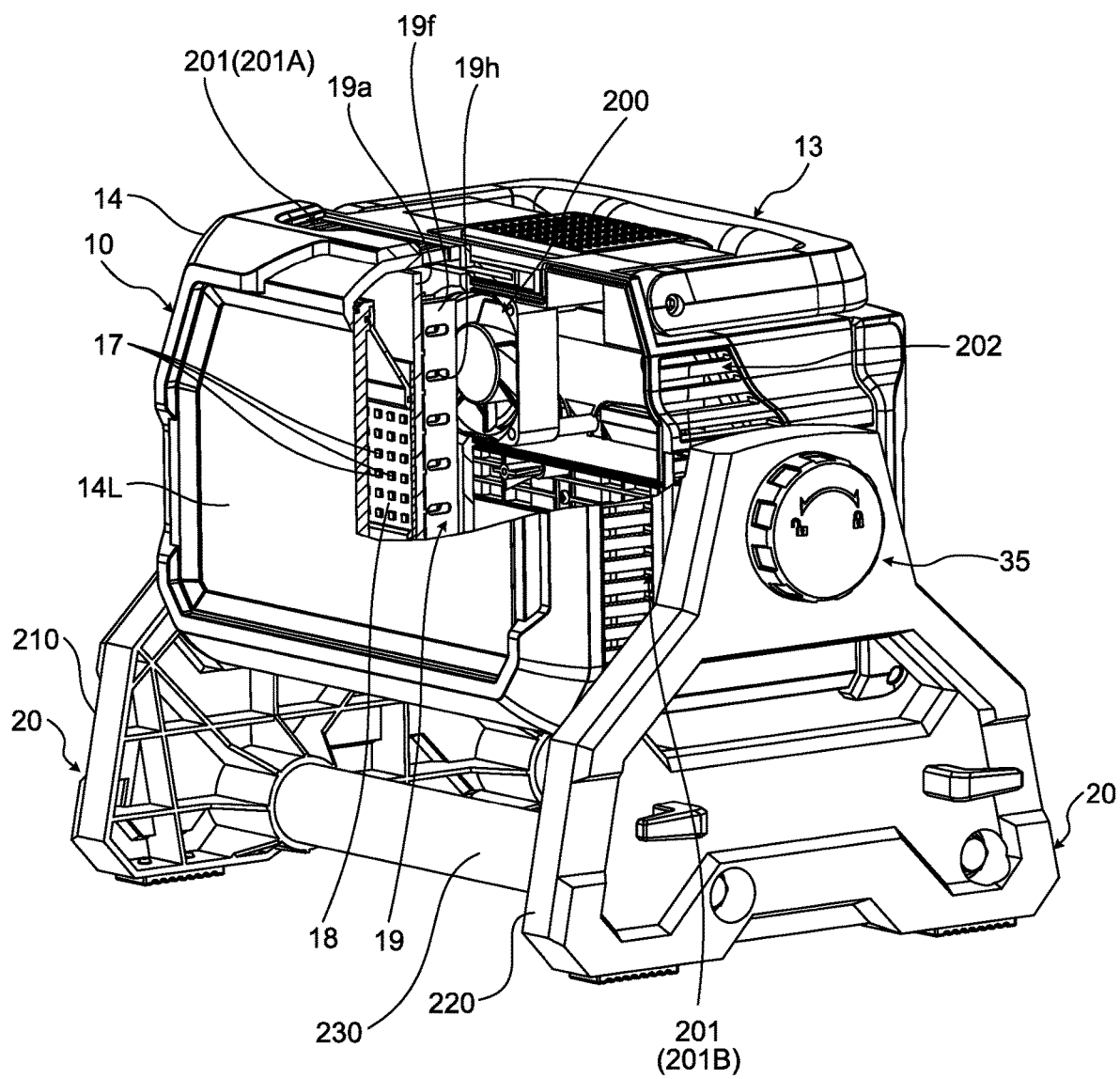
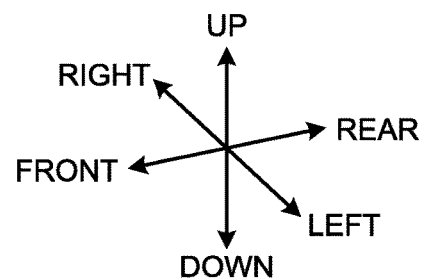

FIG.27
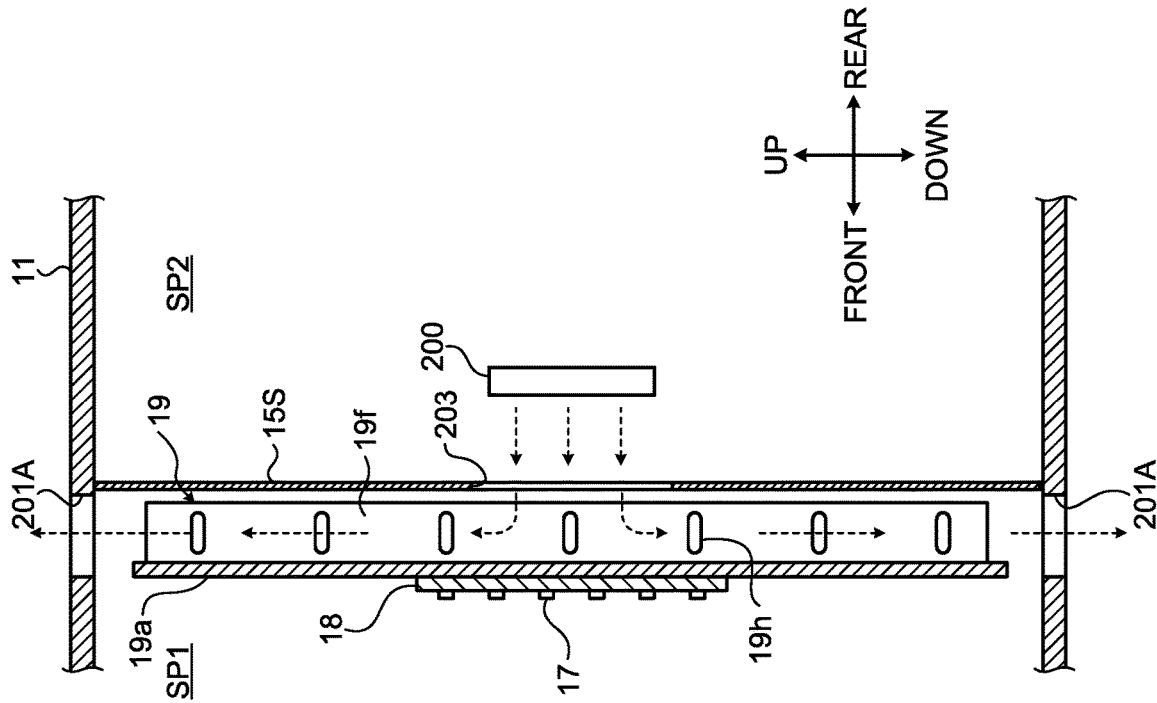
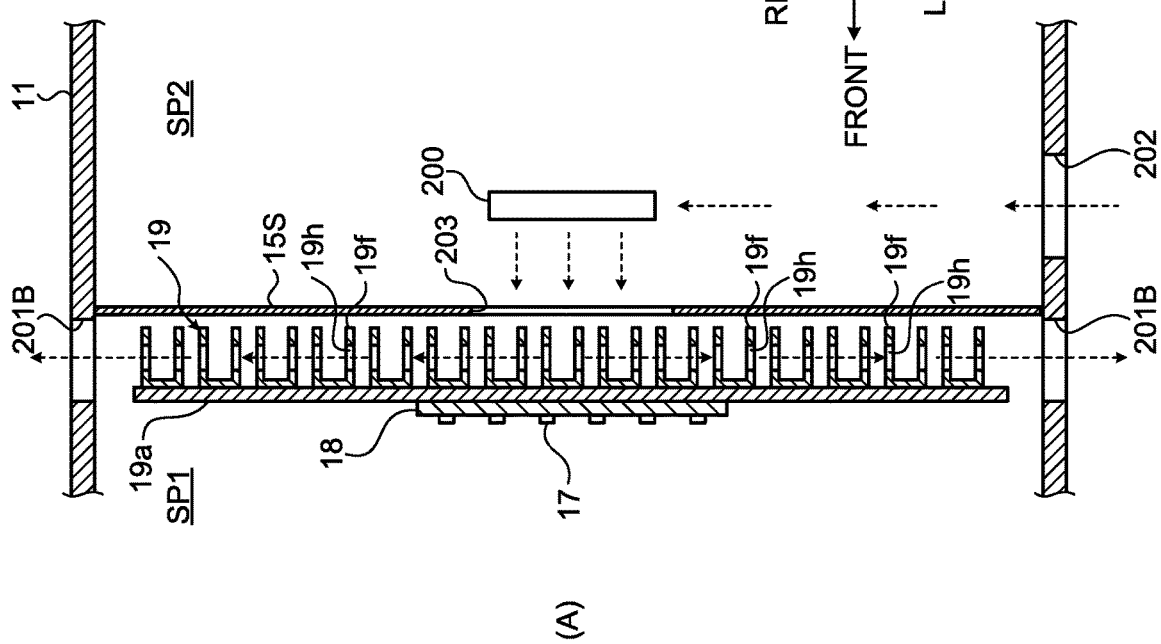

FLOODLIGHT

FIELD

The present invention relates to a floodlight.

BACKGROUND

On worksites such as construction sites, floodlights, one example of which is disclosed in Patent Literature 1, are used.

CITATION LIST

Patent Literature

Patent Literature 1: JP 2014-212025 A

SUMMARY

Technical Problem

Such a floodlight has an operation device that is operated to adjust the state of the light emission of a light emitter unit. When a floodlight having such an operation device in an upper part of the floodlight is placed at a high place, the operation device is hard to reach and is obstructed from being smoothly operated.

The floodlight also has a light source that emits light. Because such a light source becomes heated, a floodlight requires some technology for suppressing excessive heating of the light source.

An object of an aspect of the present invention is to provide a floodlight allowing an operation for adjusting the light emission state to be performed smoothly. An object of an aspect of the present invention is to provide a floodlight capable of suppressing excessive heating of the light source.

Solution to Problem

According to a first aspect of the present invention, provided is a floodlight including: a main-body member that includes a light emitter unit; an arm that is coupled to a coupling mechanism provided to a side face of the main-body member and is pivotable about a rotational axis; and an operation device that is disposed in the coupling mechanism and is operated to adjust the light emission state of the light emitter.

According to a second aspect of the present invention, provided is a floodlight including: a light source; a support member that supports the light source; and a fan that cools the light source by generating an air flow on a surface of the support member. The light source is supported on a front face of the support member and emits light forward with respect to the support member. The fan is disposed rearward of the support member, at a position facing the support member.

Advantageous Effects of Invention

According to an aspect of the present invention, provided is a floodlight allowing an operation for adjusting the light emission state to be performed smoothly. Furthermore, according to an aspect of the present invention, GI floodlight capable of suppressing excessive heating of the light source is provided.

BRIEF DESCRIPTION OF DRAWINGS

FIG. 1 is a perspective view of a floodlight according to a first embodiment.
FIG. 2 is a plan view of the floodlight according to the first embodiment.
FIG. 4 is a perspective view of a second coupling mechanism according to the first embodiment.
FIG. 19 is a perspective view of a heat-radiating member according to the fourth embodiment.
FIG. 23 is a sectional view of the floodlight according to the fourth embodiment.
FIG. 25 is a perspective view of the floodlight according to the fourth embodiment.
FIG. 27 is a schematic illustrating effects of a fan according to the fourth embodiment.

DESCRIPTION OF EMBODIMENTS

Figure 3:
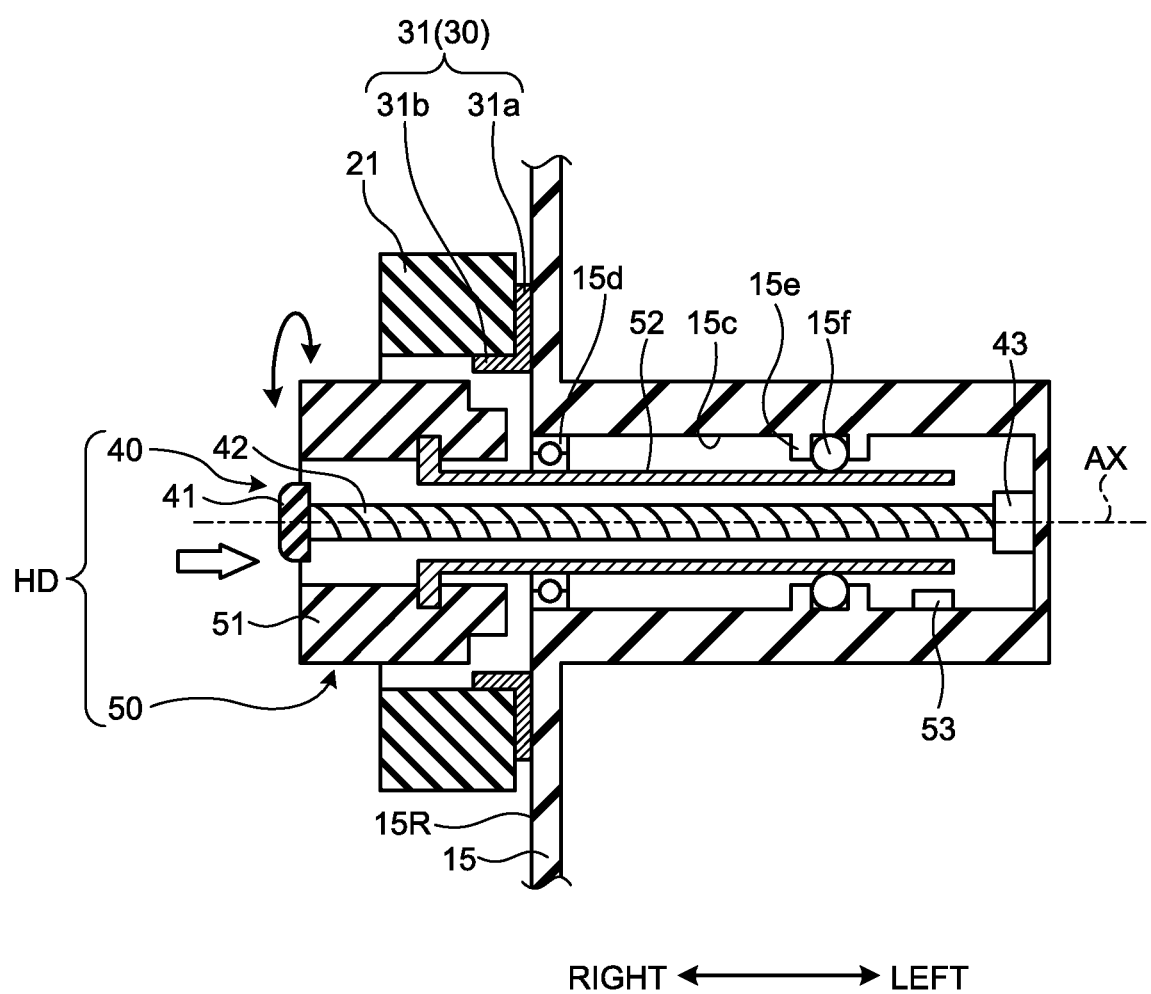
FIG. 3 is a sectional view of an operation device according to the first embodiment.

Embodiments of the present invention will now be explained below with reference to some drawings, but the scope of the present invention is not limited to the embodiments. Elements included in the embodiments described below may be combined as appropriate. Furthermore, it is also possible to omit the use of some of these elements.

First Embodiment

FIG. 1 is a perspective view of one example of a floodlight 100A according to this embodiment. FIG. 2 is a plan view of the one example of the floodlight 100A according to this embodiment. The floodlight 100A is used on a worksite such as a construction site. The floodlight 100A emits light using the power supplied thereto.

As illustrated in FIGS. 1 and 2, the floodlight 100A includes: a main-body member 10 that includes a light emitter unit 12 including light sources 17; a handle 13 that is coupled to the main-body member 10; an arm 20 that is coupled to a coupling mechanism 30 provided on a side face of the main-body member 10 and is pivotable about a rotational axis AX; an operation device HD that is disposed in the coupling mechanism 30 and is operated to adjust the light emission state of the light emitter unit 12; and a control device 60. The light emission state of the light emitter unit 12 is a concept including the light emission state of the light source 17.

In the explanation hereunder, positional relations between the parts will be explained using terms such as "front", "rear", "up", "down", "left", and "right". The light emitter unit 12 is disposed downward of a center of the main-body member 10. The handle 13 is disposed upward of the center of the main-body member 10. A downward direction is the direction opposite to an upward direction, and a rearward direction is the direction opposite to the forward direction. Lateral directions are directions that perpendicularly intersect with the forward and the upward directions. One of the lateral directions is the leftward direction, and the other lateral direction is the rightward direction.

Main-Body Member

The main-body member 10 includes a housing 11, the light emitter unit 12 that is supported by the housing 11, and a heat-radiating member 19 that supports the light emitter unit 12. The heat-radiating member 19 is supported by the housing 11. The housing 11 includes a front cover 14, a rear cover 15, and a battery cover 16. The front cover 14 is disposed forward of the rear cover 15. The front cover 14 is disposed around the light emitter unit 12. The light emitter unit 12 and the heat-radiating member 19 are housed inside of the front cover 14. The front cover 14 is made of elastomer, for example. The front cover 14 includes a lens 14L. The lens 14L is disposed forward of the light emitter unit 12. The lens 14L is made of a material capable of transmitting light. The front cover 14 has a plurality of faces that are disposed around the light emitter unit 12 and the heat-radiating member 19. The faces of the front cover 14 include a top face 14a, a bottom face 14b, a right face 14c, and a left face 14d of the front cover 14. At least two of the top face 14a, the bottom face 14b, the right face 14c, and the left face 14d of the front cover 14 are provided with openings 14K, respectively. In this embodiment, each of the top face 14a, the bottom face 14b, the right face 14c, and the left face 14d of the front cover 14 is provided with the opening 14K. The openings 14K serve as vents that connect the internal space of the front cover 14 to the external space. At least a part of the heat-radiating member 19 is exposed via the openings 14K. The heat in the light emitter unit 12 and the heat-radiating member 19 is radiated outside the housing 11, via the openings 14K. Even when the light emitter unit 12 is a high power unit, the heat generated in the light emitter unit 12 is radiated outside effectively via the openings 14K. Furthermore, even if a foreign substance gets inside of the front cover 14 via the opening 14K provided to any one of the top face 14a, the bottom face 14b, the right face 14c, and the left face 14d, the foreign substance is discharged outside the front cover 14 via the openings 14K provided to another one of the faces. The foreign substance is a concept including one or both of a solid such as a dust, and a liquid such as water.

The rear cover 15 is disposed rearward of the front cover 14. The rear cover 15 has a stepped portion 15a protruding upward. The top face of the stepped portion 15a is disposed at almost the same level as the top face of the front cover 14 in the up-and-down direction. The rear cover 15 has a first wall 15S. The first wall 15S is provided on the front part of the rear cover 15. The rear cover 15 is fastened to the front cover 14 via the first wall 15S.

The battery cover 16 is disposed rearward of the rear cover 15. The battery cover 16 is coupled to a lower part of the rear cover 15 via a hinge mechanism. The battery cover 16 is pivotably supported by the rear cover 15. The battery cover 16 may be detachably disposed to the rear cover 15. The battery cover 16 has a latch 16a protruding toward the rear cover 15. The latch 16a is disposed on the top face of the stepped portion 15a.

The light emitter unit 12 includes the light sources 17, and a control board 18 that supports the light sources 17. Light-emitting diodes (LEDs), for example, are used as the light sources 17. The light sources 17 are arranged in the up-and-down direction and the left-to-right direction, on the front face of the control board 18. The light sources 17 may emit light having the same color, or emit light having different colors. The control board 18 includes a driving circuit for driving the light sources 17, and a wiring that is connected to the driving circuit. The control board 18 controls the light emission state of the light emitter unit 12, based on a control signal from the control device 60. The heat-radiating member 19 is in contact with the control board 18. The control board 18 is fastened to the heat-radiating member 19. As described earlier, the heat-radiating member 19 is supported by the housing 11. The control board 18 supporting the light sources 17 is supported by the housing 11 via the heat-radiating member 19.

The heat-radiating member 19 is a heat sink for radiating the heat generated by the light sources 17. The heat-radiating member 19 is made of a material having a higher thermal conductivity than that of the material of which the control board 18 is made. For example, the heat-radiating member 19 is made of a metallic material such as aluminum. The heat-radiating member 19 may be made of a material containing carbon, for example.

Handle

The handle 13 is attached to the main-body member 10. The handle 13 has a pair of base portions 13a that are coupled to the rear cover 15 via a shaft portion 13b, and a holding portion 13c that connects the pair of base portions 13a. The base portions 13a are attached to the right and the left side faces of the stepped portion 15a, respectively, via the shaft portion 13b. The pivoting axis of the shaft portion 13b is in parallel with the rotational axis AX. The rotational axis AX extends along the left-to-right direction. The base portions 13a are pivotable about the shaft portion 13b. The base portions 13a extend linearly from the stepped portion 15a. The holding portion 13c is held by a worker. The worker can carry the floodlight 100A by holding the holding portion 13c.

The handle 13 can be moved between a housed position P1 and a standing position P2 (see FIG. 6, for example), by pivoting the base portions 13a about the shaft portion 13b.

When the handle 13 is positioned at the housed position P1, the handle 13 is laid along the left side, the right side, and the rear side of the stepped portion 15a. The shape and the size of the handle 13 are determined in such a manner that the base portions 13a and the holding portion 13c do not jut out from the rear cover 15, and that the top face of the handle 13 does not jut out upward from the front cover 14, when the handle 13 is disposed at the housed position P1.

When the handle 13 is positioned at the housed position P1, the handle 13 is laid on top of the battery cover 16. By positioning the handle 13 on top of the battery cover 16, a rearward movement of the battery cover 16 (open direction) is restricted. By positioning the handle 13 at the housed position P1, the battery cover 16 is suppressed from unexpectedly opening.

When the handle 13 is positioned at the standing position P2, a worker can hold the handle 13 smoothly.

Arm

The arm 20 is coupled to the coupling mechanism 30 provided on the side faces of the main-body member 10, and is pivotable about the rotational axis AX. The arm 20 has a first base portion 21, a second base portion 22, and an annular portion 23. The first base portion 21, the second base portion 22, and the annular portion 23 are integrated. The coupling mechanism 30 includes a first coupling mechanism 31 provided on a first side face 15R of the main-body member 10, and a second coupling mechanism 32 provided on the second side face 15L of the main-body member 10. The first side face 15R is the right side face of the rear cover 15, and the second side face 15L is the left side face of the rear cover 15.

The first base portion 21 is coupled to the first side face 15R of the rear cover 15 via the first coupling mechanism 31. The first base portion 21 is linear, and extends forward and downward from the first coupling mechanism 31 along the first side face 15R. The first base portion 21 is connected to the annular portion 23 via a curved portion 24. The second base portion 22 is coupled to the second side face 15L of the rear cover 15 via the second coupling mechanism 32. The second base portion 22 is linear, and extends forward and downward from the second coupling mechanism 32 along the second side face 15L. The first base portion 21 has the same size as the second base portion 22. The second base portion 22 is connected to the annular portion 23 via a curved portion 25.

The annular portion 23 has a first section 23a disposed along the first side face 15R, a second section 23b disposed along the second side face 15L, and a third section 23c disposed in parallel with the rotational axis AX. The first section 23a is connected to the curved portion 24. The second section 23b is connected to the curved portion 25. The right end of the third section 23c is connected to the first section 23a via a curved portion 26. The left end of the third section 23c is connected to the second section 23b via a curved portion 27.

The first coupling mechanism 31 is provided on the first side face 15R. The second coupling mechanism 32 is provided on the second side face 15L. The second coupling mechanism 32 includes a fastening mechanism 35 for fastening the arm 20 to the main-body member 10. The fastening mechanism 35 includes a cam 32c that restricts pivoting movements of the arm 20.

First Coupling Mechanism and Operation Device

FIG. 3 is a cross-sectional view of the operation device HD according to the embodiment, and corresponds to the cross-sectional view taken along the arrow line A-A in FIG. 2. The operation device HD is disposed in the coupling mechanism 30, and is operated to adjust the light emission state of the light emitter unit 12 (the light sources 17). The operation device HD includes a switch mechanism 40 and a dial mechanism 50.

As illustrated in FIG. 3, the operation device HD is disposed in the first coupling mechanism 31. The operation device HD is provided independently from the first base portion 21. The first coupling mechanism 31 includes a flange portion 31a and a cylindrical portion 31b. The flange portion 31a is fastened to the first side face 15R. The cylindrical portion 31b protrudes rightward from the flange portion 31a. The central axis of the cylindrical portion 31b is coincident with the rotational axis AX. The first base portion 21 is supported pivotably about the rotational axis AX by the cylindrical portion 31b.

At least a part of the switch mechanism 40 is laid along the rotational axis AX of the first coupling mechanism 31. At least a part of the dial mechanism 50 is disposed around the switch mechanism 40. The switch mechanism 40 includes a switch 41, a moving member 42, and a displacement sensor 43. The dial mechanism 50 includes a dial 51, a rotating member 52, and a rotation sensor 53.

At least part of the switch 41 is laid along the rotational axis AX, and is capable of being displaced in a direction parallel with the rotational axis AX. The right end of the switch 41 protrudes rightward from the dial 51. The dial 51 is disposed around the switch 41. The switch 41 is capable of being displaced in the left-to-right directions on the inner side of the dial 51. A worker can the switch 41. A worker can cause the switch 41 to be displaced by pushing the right end of the switch 41. The switch 41 is independent from the first base portion 21 and the first coupling mechanism 31. Therefore, the first base portion 21 and the first coupling mechanism 31 do not move even when the switch 41 is operated.

An elastic member such as a spring may be connected to the switch 41 to keep the right end of the switch 41 jutting out of the dial 51.

The moving member 42 is coupled to the switch 41. The moving member 42 has a columnar shape. The central axis of the moving member 42 is coincident with the rotational axis AX. The moving member 42 is inserted into an insertion hole 15c that is provided to the rear cover 15. As the switch 41 is displaced in the left-to-right directions, the moving member 42 is displaced, together with the switch 41, in the left-to-right directions.

The displacement sensor 43 detects the amount by which the switch 41 is displaced. The displacement sensor 43 is disposed to be in contact with the left end of the moving member 42. The displacement sensor 43 outputs an electric signal based on the amount by which moving member 42 is displaced. The displacement sensor 43 may be a contact sensor such as a piezoelectric sensor, or a non-contact sensor such as an optical sensor or a magnetic sensor.

The dial 51 is disposed around the switch 41, and is rotatable about the rotational axis AX. The dial 51 has a cylindrical shape. The central axis of the dial 51 is coincident with the rotational axis AX. The dial 51 is a multi-turn dial that can be freely rotated, without any rotatable range. The dial 51 may be a dial with a specified rotatable range. A worker can operate the dial 51. A worker can rotate the dial 51 by holding the dial 51 with his/her fingers. The dial 51 is independent from the first base portion 21 and the first coupling mechanism 31. Therefore, the first base portion 21 and the first coupling mechanism 31 are not rotated even when the dial 51 is operated.

The rotating member 52 is coupled to the dial 51. The rotating member 52 has a cylindrical shape. The central axis of the rotating member 52 is coincident with the rotational axis AX. The rotating member 52 is inserted into the insertion hole 15c provided to the rear cover 15. The inner diameter of the rotating member 52 is larger than the outer diameter of the moving member 42. The moving member 42 is disposed inside the rotating member 52. The rotating member 52 is supported on the inner circumferential surface of the insertion hole 15c via a bearing 15d.

The rotation sensor 53 detects the amount by which the dial 51 is rotated. The rotation sensor 53 outputs an electric signal based on the amount by which the rotating member 52 is rotated. The rotation sensor 53 may be a non-contact sensor such as an optical sensor or a magnetic sensor.

A wall 15e having a double-ring shape is provided to the inner circumferential surface of the insertion hole 15c. The wall 15e holds a seal member 15f such as an O ring. The seal member 15f suppresses the entry of a foreign substance into the insertion hole 15c, in which the displacement sensor 43 and the rotation sensor 53 are disposed, from the external.

Second Coupling Mechanism

FIG. 4 is a perspective view of the second coupling mechanism 32 according to the embodiment. As illustrated in FIG. 4, the second base portion 22 has a columnar portion 22a, a rod-like portion 22b, and a cam 22c. The columnar portion 22a is coupled to the second coupling mechanism 32. The rod-like portion 22b is coupled to the columnar portion 22a, and is coupled to the annular portion 23. The cam 22c restricts pivoting movements of the arm 20. The cam 22c is provided on a right tip end surface 22d of the columnar portion 22a. FIG. 4 also illustrates the columnar portion 22a seen from the side of the tip end surface 22d. The cam 22c has a plurality of protrusions that are arranged along the circumferential direction of the columnar portion 22a.

The second coupling mechanism 32 includes the fastening mechanism 35 for fastening the arm 20 to the main-body member 10. The fastening mechanism 35 includes a flange portion 32a, a columnar portion 32b, the cam 32c, a screw portion 32d, and a fastening member 32e. The flange portion 32a is fastened to the second side face 15L. The columnar portion 32b protrudes leftward from the flange portion 32a. The central axis of the columnar portion 32b is coincident with the rotational axis AX.

The cam 32c restricts pivoting movements of the arm 20. The cam 32c is provided to a tip end surface 32f of the columnar portion 32b. The cam 32c has a plurality of protrusions that are arranged along the circumferential direction of the columnar portion 32b.

The screw portion 32d protrudes leftward from the tip end surface 32f of the columnar portion 32b. The left end of the screw portion 32d has a male thread. The screw portion 32d is inserted into a through hole 22e provided to the columnar portion 22a of the second base portion 22.

The fastening member 32e has a screw hole 32g having a female thread. The female thread of the screw hole 32g is enmeshed with the male thread of the screw portion 32d. The fastening member 32e is enmeshed with the screw portion 32d from the left side of the columnar portion 22a. The columnar portion 22a and the columnar portion 32b are fastened to each other by inserting the left end of the screw portion 32d into the screw hole 32g provided to the fastening member 32e, and rotating the fastening member 32e in one of the rotating directions about the rotational axis AX. The fastening of the columnar portion 22a and the columnar portion 32b is loosened by rotating the fastening member 32e in the other rotating direction about the rotational axis AX.

With the columnar portion 22a and the columnar portion 32b fastened to each other, the cam 22c of the second base portion 22 and the cam 32c of the second coupling mechanism 32 are enmeshed with each other. As a result, rotations of the columnar portion 22a about the rotational axis AX are restricted.

With fastening between the columnar portion 22a and the columnar portion 32b loosened, the mesh between the cam 22c of the second base portion 22 and the cam 32c of the second coupling mechanism 32 is released. As a result, the columnar portion 22a can be rotated about the rotational axis AX. Furthermore, with the mesh between the cam 22c and the cam 32c released, the position of the arm 20 in the rotating direction about the rotational axis AX can be adjusted.

The annular portion 23 couples the first base portion 21 and the second base portion 22. The annular portion 23 is curved forward from the first base portion 21 and the second base portion 22. The annular portion 23 includes a cable-winding portion 23d around which a cable for connecting the main-body member 10 and an AC power source is wound, and a connecting portion 23e that is connected to a tripod or a vise.

Heat-Radiating Member

Figure 5:
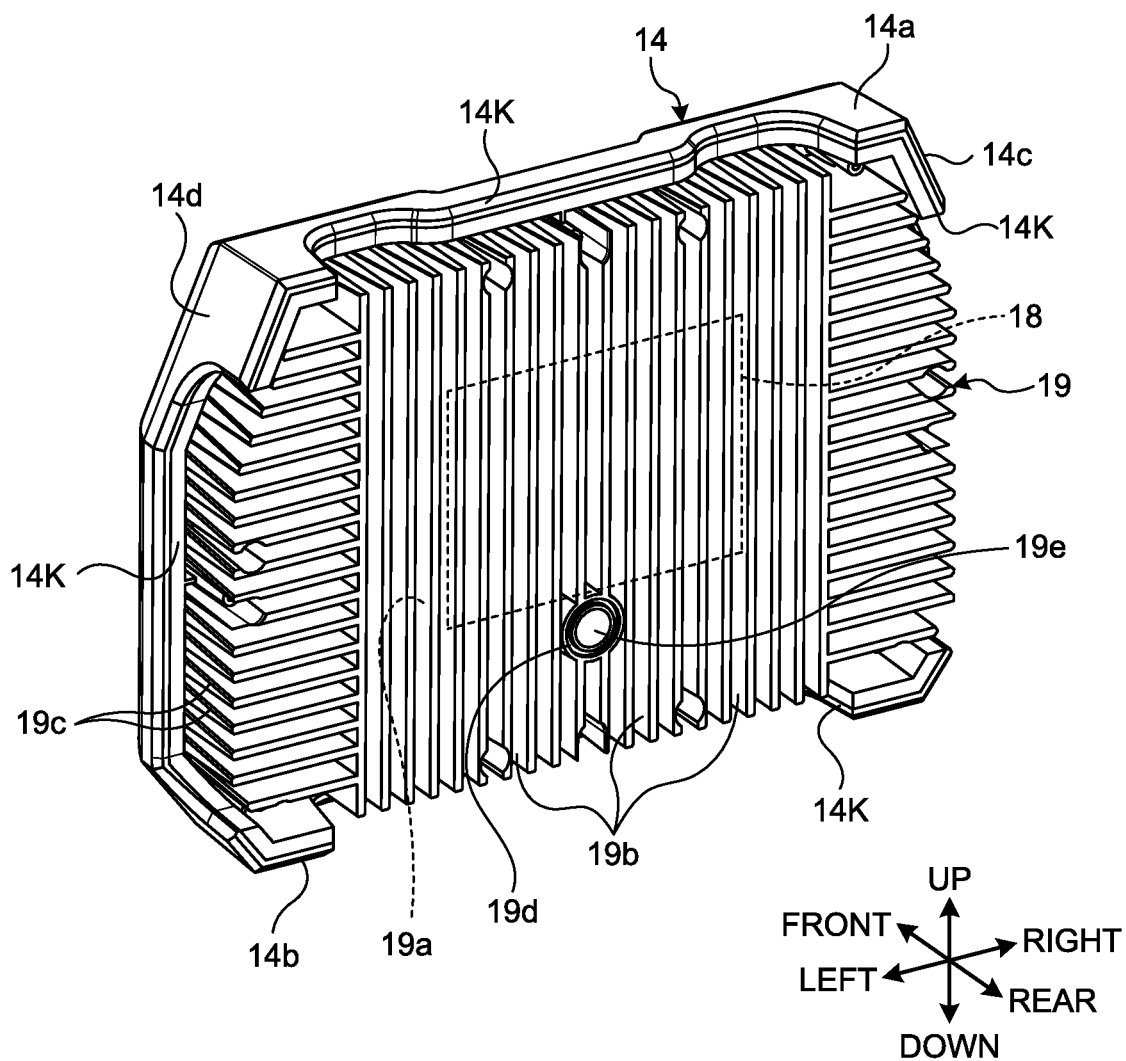
FIG. 5 is a perspective view of the heat-radiating member according to the first embodiment.

FIG. 5 is a perspective view of the heat-radiating member 19 according to the embodiment. FIG. 5 illustrates the heat-radiating member 19 housed inside the front cover 14, from a viewpoint on the rear side. As illustrated in FIG. 5, the heat-radiating member 19 includes a support panel 19a, fins 19b and fins 19c, a fastening member inserting portion 19d, and a pass-through portion 19e. The support panel 19a supports the control board 18. The control board 18 is in contact with the support panel 19a. The fins 19b and the fins 19c are supported by the rear face of the support panel 19a, and protrude rearward from the support panel 19a. The fins 19b each have a plate-like shape extending in the up-and-down direction, and are provided with a space therebetween in the left-to-right direction. The fins 19c each have a plate-like shape extending in the left-to-right direction, and are provided with a space therebetween in the up-and-down direction. A fastening member for fastening the heat-radiating member 19 is inserted into the fastening member inserting portion 19d. Wirings connected to the control board 18 are placed inside of the pass-through portion 19e.

Battery Mounting Unit

Figure 6:
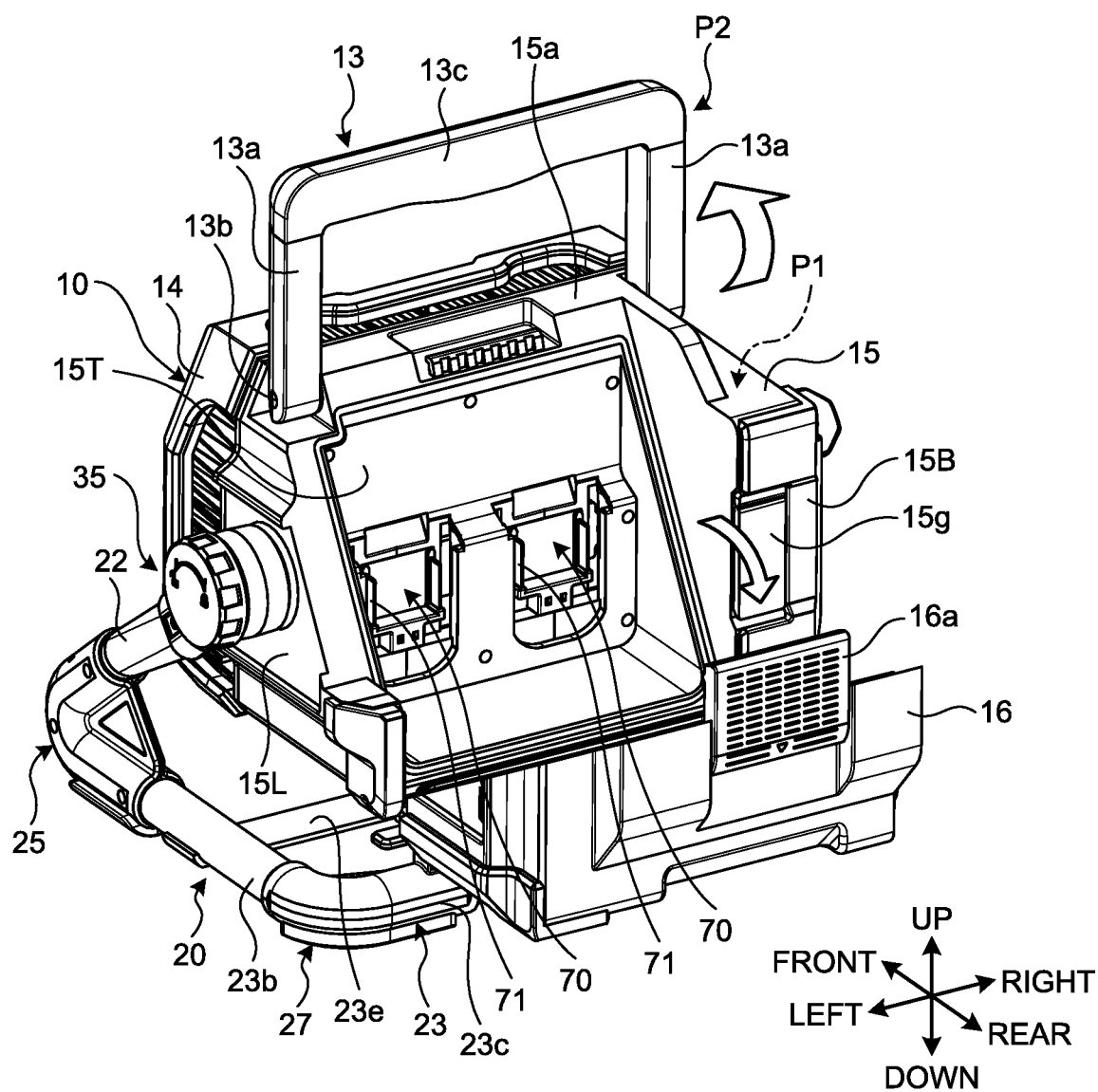
FIG. 6 is a perspective view of the floodlight according to the first embodiment, seen from a rear side.
Figure 7:
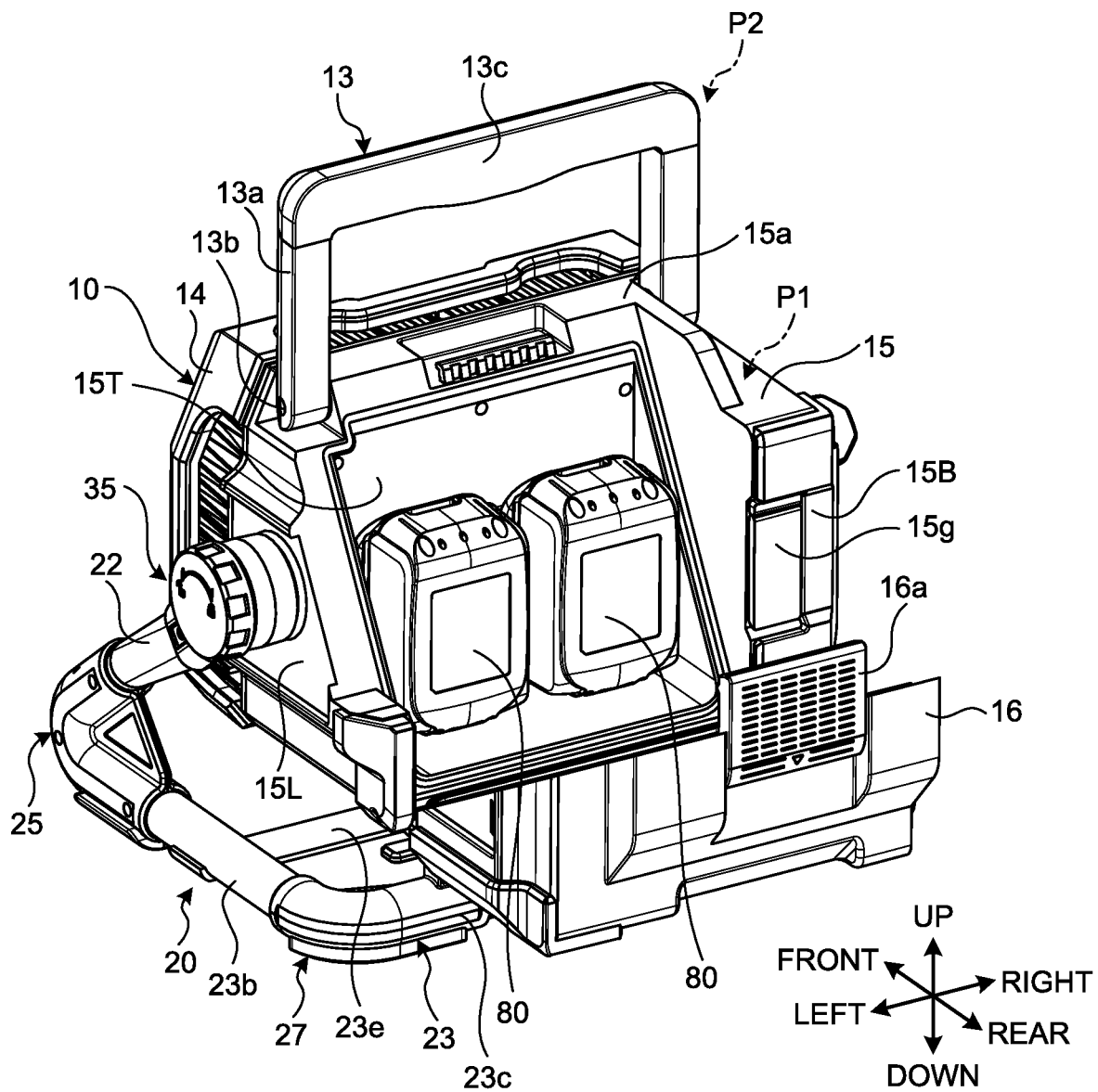
FIG. 7 is a perspective view of the floodlight according to the first embodiment, seen from the rear side.

FIGS. 6 and 7 are perspective views of the floodlight 100A according to this embodiment, seen from the rear side, with the battery cover 16 pivoted rearward (open direction). The main-body member 10 includes a battery mounting unit 70 where an electric-tool battery 80 is mounted. The electric-tool battery 80 is a rechargeable battery. The battery mounting unit 70 is covered with the battery cover 16. When the electric-tool battery 80 is to be mounted on the battery mounting unit 70, or when the electric-tool battery 80 is to be removed from the battery mounting unit 70, the battery cover 16 is pivoted rearward. FIG. 6 illustrates the battery mounting unit 70 with the electric-tool batteries 80 removed. FIG. 7 illustrates the battery mounting unit 70 with the electric-tool batteries 80 mounted.

When the battery cover 16 is to be pivoted rearward, the handle 13 is lifted so that the handle 13 comes to the standing position P2. As a result, the battery cover 16 is in a pivotable state. After the handle 13 is positioned at the standing position P2, by removing the latch 16a, the battery cover 16 is pivoted in a direction in which an upper part of the battery cover 16 moves rearward. Once the battery cover 16 is pivoted rearward, the battery mounting unit 70 becomes exposed, as illustrated in FIG. 6. When the battery cover 16 is pivoted forward (close direction), the latch 16a is moved to the position above the stepped portion 15a, and the battery mounting unit 70 is covered with the battery cover 16.

The battery mounting unit 70 is disposed rearward of the light emitter unit 12, and at least two electric-tool batteries 80 can be mounted thereon. The rear cover 15 has a second wall 15T. The second wall 15T is provided on the rear part of the rear cover 15. The battery mounting unit 70 is disposed on the second wall 15T. Two battery mounting units 70 are provided on the second wall 15T in the left-to-right direction. The number of the battery mounting units 70 may be one, or any number equal to or more than three. The battery mounting unit 70 may be provided in plurality in the up-and-down directions.

The electric-tool battery 80 is mounted on the battery mounting unit 70. The battery mounting unit 70 has a guide portion 71 for guiding the electric-tool battery 80. The electric-tool battery 80 is mounted on the battery mounting unit 70 by sliding the electric-tool battery 80 downward with respect to the battery mounting unit 70, with the guide of the guide portion 71. By mounting the electric-tool battery 80 on the battery mounting unit 70, the main-body member 10 can be energized by the electric-tool battery 80. The light emitter unit 12, the switch mechanism 40, the dial mechanism 50, and the control device 60 are driven by the power supplied from the electric-tool battery 80. A remaining charge signal indicating the remaining charge in the electric-tool battery 80 is output to the control device 60.

Power Supply Cable

Figure 8:
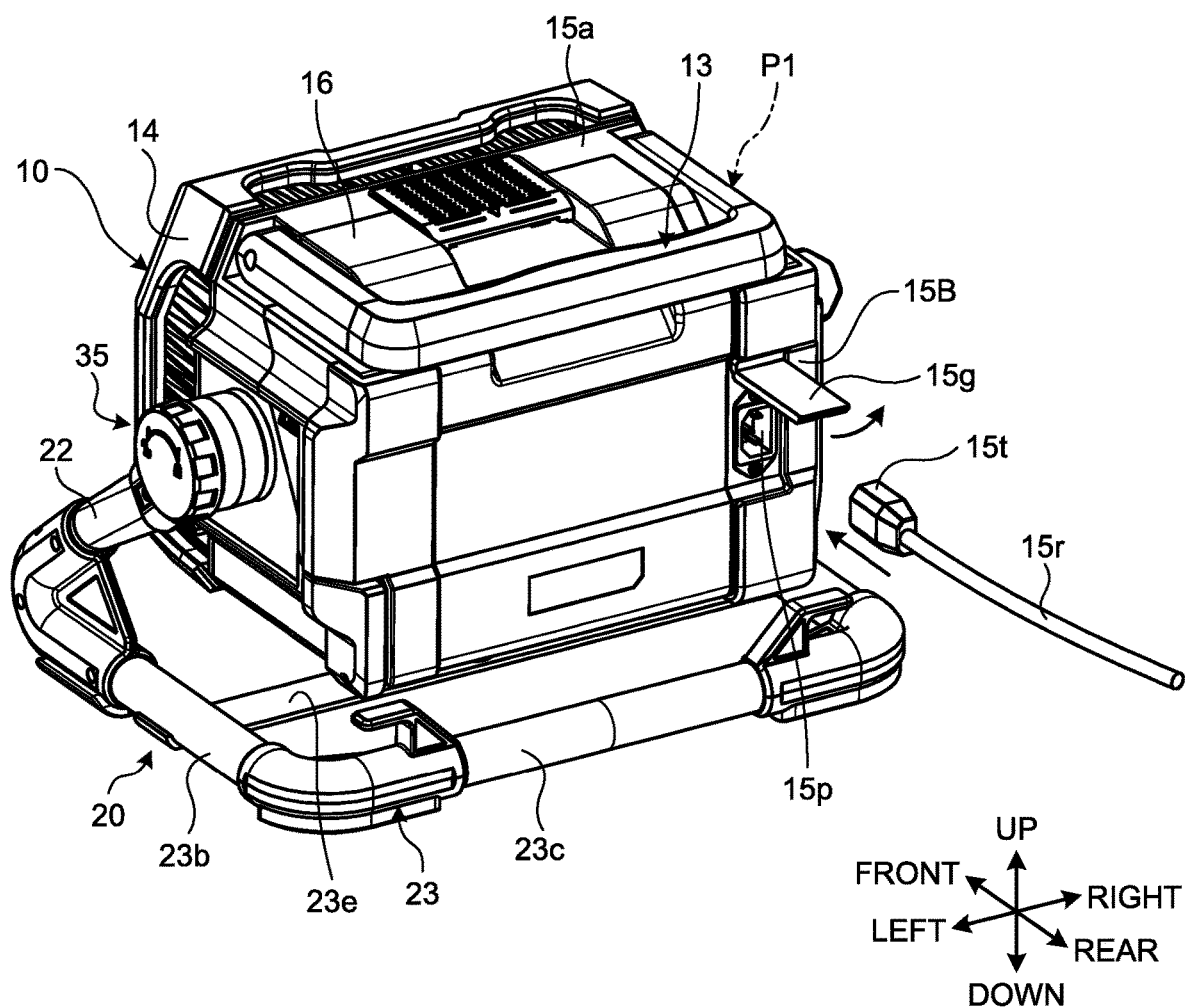
FIG. 8 is a perspective view of the floodlight according to the first embodiment, seen from the rear side.

FIG. 8 is a perspective view of the floodlight 100A according to this embodiment seen from the rear side, with a power supply cable 15r connected to the floodlight 100A. As illustrated in FIG. 8, a connector connecting portion 15p is provided on the rear face 15B of the rear cover 15. A connector 15t of the power supply cable 15r is connected to the connector connecting portion 15p. The connector connecting portion 15p is covered with a connecting portion cover 15g. The connecting portion cover 15g is coupled to the rear face 15B via a hinge mechanism. FIG. 8 illustrates the opened connecting portion cover 15g.

Internal Space

Figure 9:
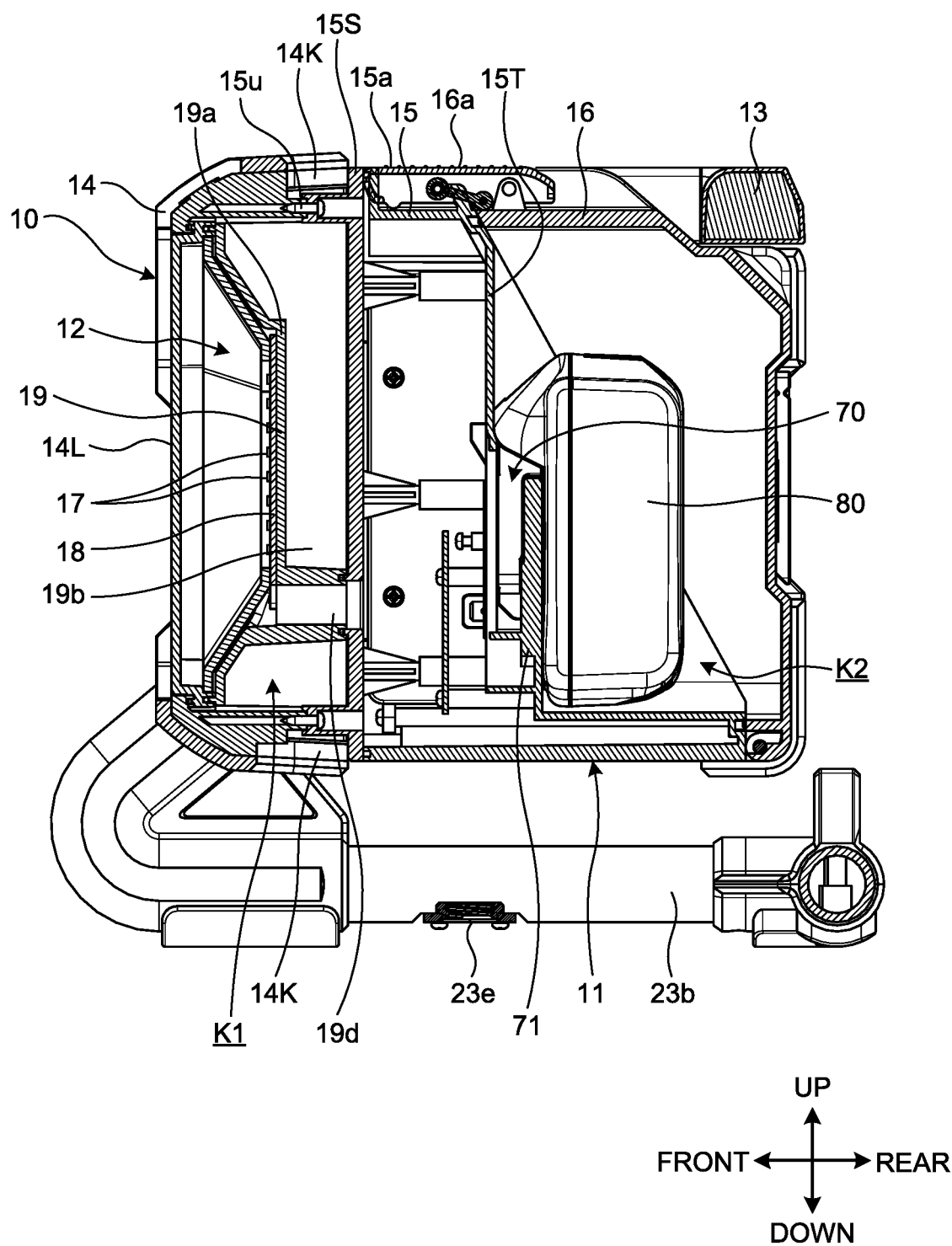
FIG. 9 is a sectional view of the floodlight according to the first embodiment.

FIG. 9 is a cross-sectional view of the floodlight 100A according to this embodiment, and corresponds to a cross-sectional view taken along the arrow line B-B in FIG. 2. As illustrated in FIG. 9, the housing 11 has an internal space in which the light emitter unit 12, the heat-radiating member 19, and the electric-tool battery 80 are housed. The internal space of the housing 11 is partitioned into a first space K1 in which the heat-radiating member 19 is housed, and a second space K2 in which the electric-tool batteries 80 are housed. The first space K1 is defined by the front cover 14 and the first wall 15S of the rear cover 15. The front cover 14 is fastened to the first wall 15S, using a screw member 15u. The second space K2 is defined by the second wall 15T of the rear cover 15 and the battery cover 16. The battery cover 16 suppresses the entry of a foreign substance into the second space K2.

Control Device

Figure 10:
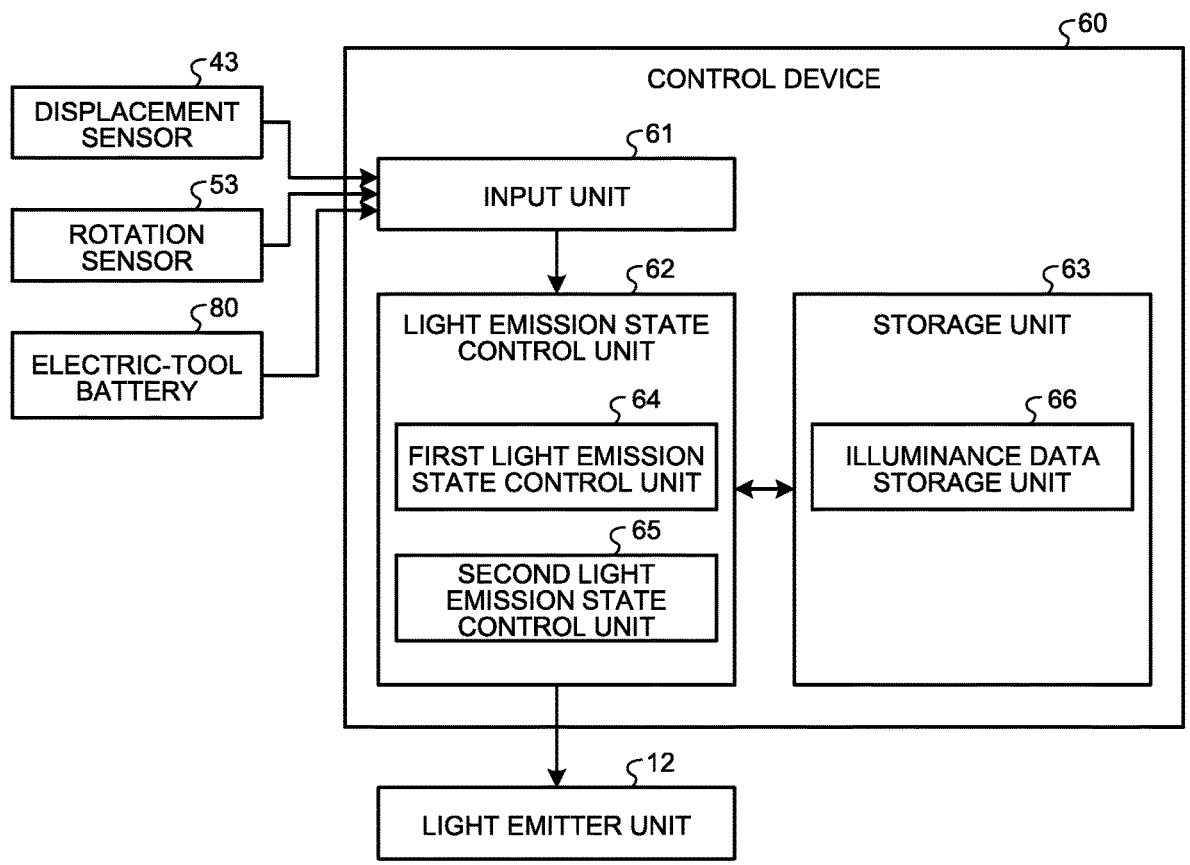
FIG. 10 is a functional block diagram illustrating a control device according to the first embodiment.

FIG. 10 is a functional block diagram illustrating the control device 60 according to the embodiment. The control device 60 includes a processor that includes a central processing unit (CPU), and a storage device that includes a random access memory (RAM) or a read-only memory (ROM). The control device 60 is placed in the internal space of the rear cover 15, for example.

The control device 60 includes an input unit 61, a light emission state control unit 62, and a storage unit 63.

The input unit 61 acquires input signals. The input signals acquired by the input unit 61 include a detection signal from the displacement sensor 43, a detection signal from the rotation sensor 53, and a remaining charge signal from the electric-tool battery 80.

The light emission state control unit 62 outputs a control signal for controlling the light emission state of the light emitter unit 12 (the light sources 17), based on an amount by which the operation device HD is operated. The amount by which the operation device HD is operated includes the amount by which the switch 41 is displaced and the amount by which the dial 51 is rotated. The light emission state control unit 62 controls the light emission state of the light emitter unit 12 based on the input signal input to the input unit 61. The light emission state control unit 62 includes a first light emission state control unit 64 and a second light emission state control unit 65.

The first light emission state control unit 64 outputs a control signal for controlling the light emission state of the light emitter unit 12 (the light sources 17) based on the amount by which the displacement sensor 43 is operated. The light emission state control of the light emitter unit 12, which is performed by the first light emission state control unit 64, includes at least one of control for switching the light emitter unit 12 between an on state, a blinking state, and an off state, and control for switching the color of the light emitted from the light emitter unit 12. The first light emission state control unit 64 performs, as the light emission state control, at least one of the control for switching the light emitter unit 12 between the on state, the blinking state, and the off state, and control for switching the color of the light emitted from the light emitter unit 12.

When a worker operates the switch 41 of the switch mechanism 40, the displacement sensor 43 detects the amount by which the switch 41 is displaced. The displacement sensor 43 then outputs the detection signal to the control device 60. The first light emission state control unit 64 then controls the light emission state of the light emitter unit 12 based on the detection signal input from the displacement sensor 43 to the input unit 61.

The first light emission state control unit 64 be may configured to switch the light emission state between the on state, the blinking state, and the off state, based on the time for which the switch 41 is operated, or based on the time from when the switch 41 is operated for the first time to when the switch 41 is operated next time. For example, the first light emission state control unit 64 may be configured to control the light emission state so that the light emission state is changed between when a worker operates the switch 41 for time equal to or longer than a predetermined time (when pressed long), and when the worker operates the switch 41 for time equal to or less than the predetermined time.

Furthermore, if the switch 41 is operated for time equal to or longer than the predetermined time while the light emitter unit 12 is on, the first light emission state control unit 64 may change the light emission state to the off state, and if the switch 41 is operated for time equal to or less than the predetermined time, change the light emission state to the blinking state, or maintain the on state. If the switch 41 is operated for time equal to or longer than the predetermined time while the light emitter unit 12 is off, the first light emission state control unit 64 may change the light emission state to the on state, and if the switch 41 is operated for time equal to or less than the predetermined time, change the light emission state to the blinking state, or maintain the off state.

Furthermore, if the switch 41 is operated for time equal to or longer than the predetermined time while the light emitter unit 12 is emitting light in a first color, the first light emission state control unit 64 may change the light emission state to a state of emitting light in a second color, and, if the switch 41 is operated for time equal to or less than the predetermined time, change the light emission state to a state of emitting light in a third color, or maintain the state of emitting light in the first color.

Furthermore, the first light emission state control unit 64 may be configured to control to change the light emission state to a different light emission state when the switch 41 is operated for the second time within a predetermined time since when the switch 41 is operated for the first time, for example.

Furthermore, the first light emission state control unit 64 may be configured to control the light emission state of the light emitter unit 12 based on the detection signal from the rotation sensor 53. For example, with a configuration in which the dial 51 has a limited rotatable range, the first light emission state control unit 64 may change the light emission state of the light emitter unit 12 to the off state when the rotational position of the dial 51 reaches the lower boundary or the upper boundary of the rotatable range.

Furthermore, the first light emission state control unit 64 may be configured to control the light emission state of the light emitter unit 12 based on the remaining charge signal from the electric-tool battery 80. For example, when the remaining charge signal from the electric-tool battery 80 drops to a level lower than a remaining charge threshold while the light emitter unit 12 is on, the first light emission state control unit 64 may change the light emission state to the blinking state of the light emitter unit 12, or to change the color of the light emitted from the light emitter unit 12.

The second light emission state control unit 65 outputs a control signal for controlling the light emission state of the light emitter unit 12 (the light sources 17) based on the detection signal from the rotation sensor 53. The light emission state control performed by the second light emission state control unit 65 includes control of illuminance on a predetermined illuminance reference surface F (see FIG. 2) irradiated with the light emitted from the light emitter unit 12. The illuminance reference surface F is a virtual plane defined at a position that is away from the light emitter unit 12 by a predetermined distance in a forward direction. The illuminance takes a higher value when the quantity of the light emitted from the light emitter unit 12 is greater, and takes a lower value when the quantity of light is smaller. The quantity of the light emitted from the light emitter unit 12 is the sum of the quantities of light emitted from the respective light sources 17. The quantity of the light emitted from a light source 17 takes a greater value when the current supplied to the light source 17 is higher, and takes a smaller value when the current is lower. Therefore, the illuminance on the illuminance reference surface F changes depending on the current supplied to the light sources 17. The light emission state control performed by the second light emission state control unit 65 includes control of the current supplied to the light sources 17. The storage unit 63 stores therein correlation data indicating a relation between a current supplied to the light sources 17, and illuminance corresponding to the current, on the illuminance reference surface F. The correlation data can be obtained in advance, by carrying out experiments or simulations. When the illuminance on the illuminance reference surface F is to be changed, the second light emission state control unit 65 sets a target current corresponding to the illuminance after the change, and controls the current supplied to the light sources 17 based on the set target.

The second light emission state control unit 65 may be configured to control the illuminance on the illuminance reference surface F, that is, the current supplied to the light sources 17, based on a detection signal from the rotation sensor 53, for example. When a worker rotates the dial 51 on the dial mechanism 50, the rotation sensor 53 detects the amount by which the dial 51 is rotated. The rotation sensor 53 then outputs the detection signal to the control device 60. The second light emission state control unit 65 then controls the current supplied to the light sources 17 based on the detection signal that is input from the rotation sensor 53 to the input unit 61.

The second light emission state control unit 65 may be configured to control the current supplied to the light sources 17 based on a remaining charge in the electric-tool battery 80 that is mounted on the battery mounting unit 70, for example. The electric-tool battery 80 outputs a remaining charge signal indicating the remaining charge. The second light emission state control unit 65 then detects the remaining charge in the electric-tool battery 80, based on the remaining charge signal output from the electric-tool battery 80. If the remaining charge in the electric-tool battery 80 drops to a level lower than a remaining charge threshold, the second light emission state control unit 65 reduces the level of current supplied to the light sources 17.

The storage unit 63 stores therein the illuminance controlled by the control of the second light emission state control unit 65, that is, a target current. The storage unit 63 includes an illuminance data storage unit 66 storing therein a target of a current corresponding to an illuminance on the illuminance reference surface F. The second light emission state control unit 65 stores the set target current in the storage unit 63, at a constant cycle. When the light emitter unit 12 is to be turned off once, and then to be turned on again, for example, the second light emission state control unit 65 controls the current supplied to the light sources 17 based on the target current stored in the storage unit 63 at the last cycle while the light emitter unit 12 is off.

Use Mode

Explained now is how the floodlight 100A according to this embodiment is used. The floodlight 100A is used on a worksite where workers work using some electric tools, for example. The floodlight 100A may be placed on the ground or on an installation table. When the floodlight 100A is a stationary floodlight that is to be placed directly on the ground or an installation table, the arm 20 is disposed downward of the main-body member 10. The direction in which the light is emitted from the light emitter unit 12 is adjusted by adjusting the positional relation of the main-body member 10 with respect to the arm 20, by rotating the main-body member 10 about the rotational axis AX.

Figure 11:
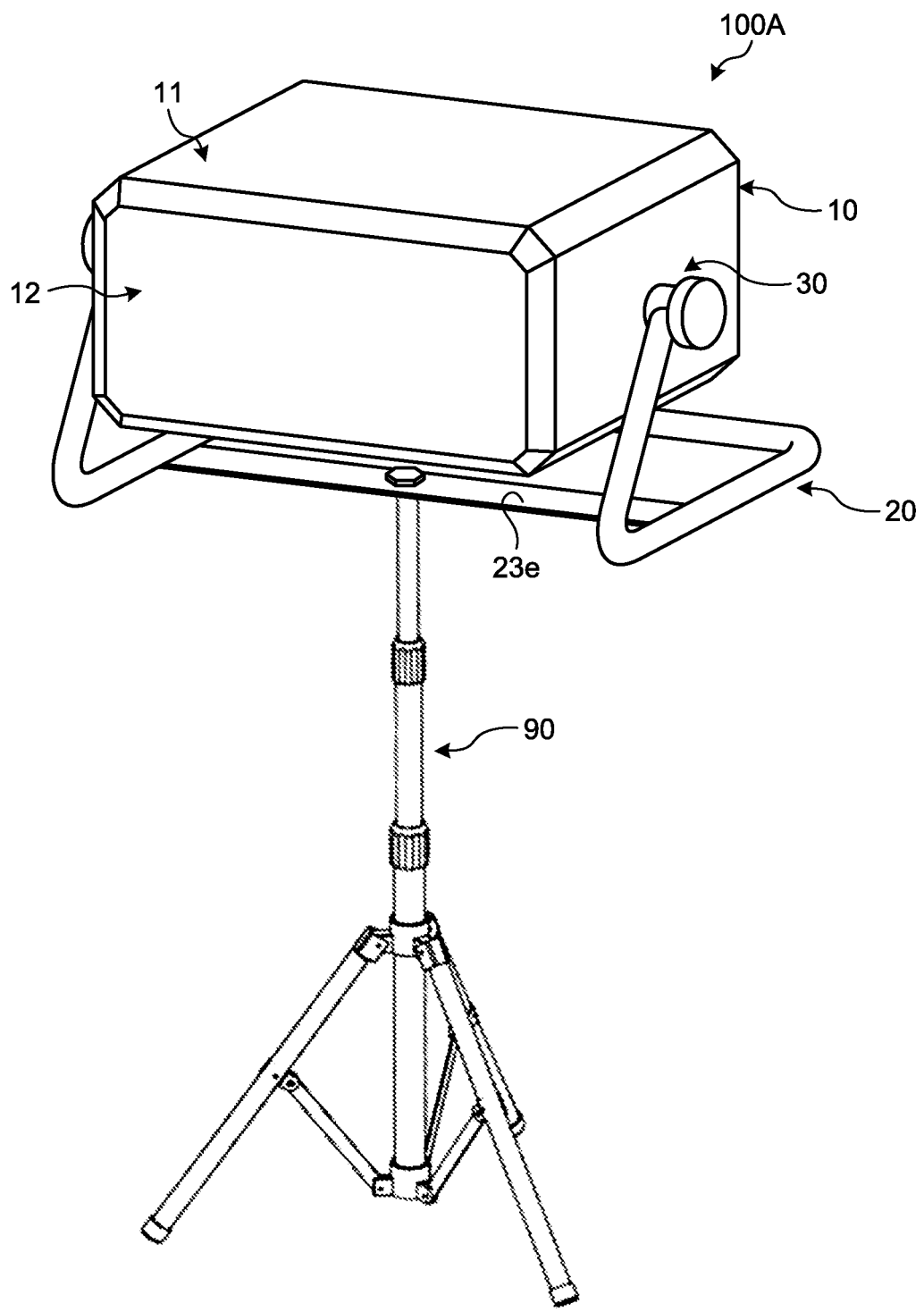
FIG. 11 is a schematic illustrating how the floodlight according to the first embodiment is used.

FIG. 11 is a schematic illustrating how the floodlight 100A according to this embodiment is used. As illustrated in FIG. 11, the floodlight 100A may be supported on a special tripod stand 90. The floodlight 100A is supported on the tripod stand 90 by connecting the connecting portion 23e provided to the annular portion 23 of the arm 20 to the tripod stand 90.

The floodlight 100A may be supported on a tripod stand designed for use for another purpose, such as a tripod stand for attaching a laser marker, or a tripod stand for attaching a camera. Furthermore, the tripod stand 90 can support a plurality of floodlights 100A, by attaching an attachment capable of coupling a plurality of floodlights 100A, to the tripod stand 90.

When the switch 41 of the switch mechanism 40 is operated to switch the light emitter unit 12 between the on state, the blinking state, and the off state, the displacement sensor 43 outputs a detection signal to the control device 60, based on the amount by which the switch 41 is displaced. The control device 60 then switches the light emitter unit 12 between the on state, the blinking state, and the off state based on the detection signal from the displacement sensor 43.

When the dial 51 on the dial mechanism 50 is operated to control the illuminance of the light emitted from the light emitter unit 12, the rotation sensor 53 outputs a detection signal to the control device 60 based on the amount by which the dial 51 is rotated. The control device 60 then changes the level of current supplied to the light sources 17, based on the detection signal from the rotation sensor 53.

In this manner, the worker can operate the operation device HD disposed on the first side face 15R that is one of the first side face 15R and the second side face 15L that are the side faces of the main-body member 10. Therefore, even a worker who is holding an electric tool in one hand can operate the operation device HD with the other hand, for example. Furthermore, because the switch 41 and the dial 51 are disposed on the side face of the main-body member 10, a worker can operate the switch 41 and the dial 51 easily even when the floodlight 100A is placed at a high place.

Furthermore, for example, in an operation of pivoting the arm 20 with respect to the main-body member 10, the arm 20 can be pivoted easily, because fastening of the cam 22c and the cam 32c is loosened by rotating the fastening member 32e in the one direction for loosening the fastening. Furthermore, when the columnar portion 22a is aligned with the columnar portion 32b by pivoting the arm 20, and the fastening member 32e is then rotated in the other direction, the columnar portion 22a is fastened. When a worker is to pivot the arm 20 in the manner described above, the worker can operate the fastening mechanism 35 disposed on the second side face 15L that is the other side face of the first side face 15R and the second side face 15L of the main-body member 10. Therefore, even a worker who is holding an electric tool in one hand can operate the fastening mechanism 35 easily using the other hand.

Advantageous Effects

As explained above, the floodlight 100A according to this embodiment includes the main-body member 10 that includes the light emitter unit 12, the arm 20 that is coupled to the coupling mechanism 30 provided on the side faces of the main-body member 10, and that is pivotable about the rotational axis AX, and the operation device HD that is disposed in the coupling mechanism 30, and that is operated to adjust the light emission state of the light emitter unit 12.

According to this embodiment, because the operation device HD that is operated to adjust the light emission state of the light emitter unit 12 is laid along the rotational axis AX of the coupling mechanism 30, the operation device HD does not interfere with the arm 20. Furthermore, because the operation device HD is disposed on the lateral side of the main-body member 10, the operation for adjusting the light emission state can be performed smoothly, even when the main-body member 10 is placed at a high place.

In this embodiment, the coupling mechanism 30 includes the first coupling mechanism 31 provided on the first side face 15R of the main-body member 10, and the second coupling mechanism 32 provided on the second side face 15L of the main-body member 10. The operation device HD is disposed in the first coupling mechanism 31, and the second coupling mechanism 32 includes the fastening mechanism 35 for fastening the arm 20 to the main-body member 10. With this configuration, the operation device HD is suppressed from being operated unintentionally while the fastening member 32e of the fastening mechanism 35 is being operated. The fastening member 32e is also suppressed from being operated unintentionally while the operation device HD is being operated.

In this embodiment, the fastening mechanism 35 includes the cam 32c that restricts pivoting movements of the arm 20. Because the cam 32c restricts the pivoting movements of the arm 20, the pivoting movements of the arm 20 can be restricted even without providing a fastening mechanism to the first coupling mechanism 31.

In this embodiment, the operation device HD includes the switch 41 at least a part of which is laid along the rotational axis AX, and that is displaceable in a direction parallel with the rotational axis AX, and the dial 51 that is disposed around the switch 41, and that is rotatable about the rotational axis AX. Because the switch 41 and the dial 51 that are operated differently are provided as the operation device HD, a worker can operate the operation device HD easily.

In this embodiment, the light emission state control unit 62 for controlling the light emission based on the amount by which the operation device HD is operated is provided. The amount by which the operation device HD is operated includes the amount by which the switch 41 is displaced and the amount by which the dial 51 is rotated. In this manner, the operations of the switch 41 and the dial 51 are reflected appropriately to the light emission state.

In this embodiment, the displacement sensor 43 for detecting the amount by which the switch 41 is displaced is provided. The light emission state control unit 62 includes the first light emission state control unit 64 that controls the light emission state based on the detection signal from the displacement sensor 43. With this configuration, an operation of the switch 41 is reflected appropriately to the light emission state.

In this embodiment, the light emission state control performed by the first light emission state control unit 64 includes at least one of the control for causing the light emitter unit 12 (the light sources 17) to switch between the on state, the blinking state, and the off state, and control for switching the color of the light emitted from the light emitter unit 12. With this control, the state of the light emitted from the light emitter unit 12 can be changed variously.

In this embodiment, the rotation sensor 53 for detecting the amount by which the dial 51 is rotated is provided. The light emission state control unit 62 includes the second light emission state control unit 65 that controls the light emission state based on the detection signal from the rotation sensor 53. With this configuration, an operation of the dial 51 is reflected appropriately as a change in the illuminance.

In this embodiment, the light emission state control performed by the second light emission state control unit 65 includes the control of illuminance on the predetermined illuminance reference surface F irradiated with the light emitted from the light emitter unit 12 (the light sources 17). With this configuration, the light emitter unit 12 can emit light at various light quantities.

In this embodiment, the storage unit 63 for storing therein the illuminance achieved by the control of the second light emission state control unit 65 is provided. When the light emitter unit 12 (the light sources 17) having been off is to be turned on, the second light emission state control unit 65 controls the light emitter unit 12 (the light sources 17) to emit light at the illuminance that is stored in the storage unit 63 during the time in which the light emitter unit 12 (the light sources 17) is off. When the light emitter unit 12 is to be turned on again, the light is emitted at the illuminance at which light has been emitted by the light emitter unit 12 immediately previously. Therefore, it is not necessary to go through cumbersome re-adjustment of the illuminance of the light emitter unit 12.

In this embodiment, the battery mounting unit 70 on which the electric-tool battery 80 is mounted is provided to the main-body member 10. The light emission state control unit 62 controls the light emission state based on the remaining charge of the battery mounted on the battery mounting unit 70. With this configuration, a notification of the remaining charge of the electric-tool battery 80 is sent to the external, effectively.

In this embodiment, the battery mounted on the battery mounting unit 70 is the electric-tool battery 80 capable of being mounted on electric tools. With this configuration, on a worksite in which electric tools are used, the electric-tool battery 80 used in the electric tools can be also used in the floodlight 100A.

In this embodiment, at least two electric-tool batteries 80 can be mounted on the battery mounting unit 70. With this configuration, enough power to allow the light emitter unit 12 to emit light can be ensured.

In this embodiment, the main-body member 10 has the heat-radiating member 19 to which the light emitter unit 12 is fastened, and the front cover 14 that is disposed around the light emitter unit 12, and that has the faces (the top face 14a, the bottom face 14b, the right face 14c, the left face 14d) surrounding the light emitter unit 12 and the heat-radiating member 19; and at least two faces of the front cover 14 are provided with the openings 14K. With this configuration, even if a foreign substance gets inside of the front cover 14 via the opening 14K provided to one of the faces of the front cover 14, the foreign substance is discharged from the opening 14K provided to another side face.

In this embodiment, the main-body member 10 has the first wall 15S that forms, together with the front cover 14, the first space K1 for housing the heat-radiating member 19, the second wall 15T on which the battery mounting unit 70 is disposed, and the battery cover 16 that forms, together with the second wall 15T, the second space K2 in which the electric-tool battery 80 is housed. The battery cover 16 can restrict entry of a foreign substance into the second space K2.

Second Embodiment

A second embodiment will now be explained. In the explanation below, the elements that are the same as those according to the embodiment described above are assigned with the same reference signs, and explanations thereof will be simplified or omitted.

Figure 12:
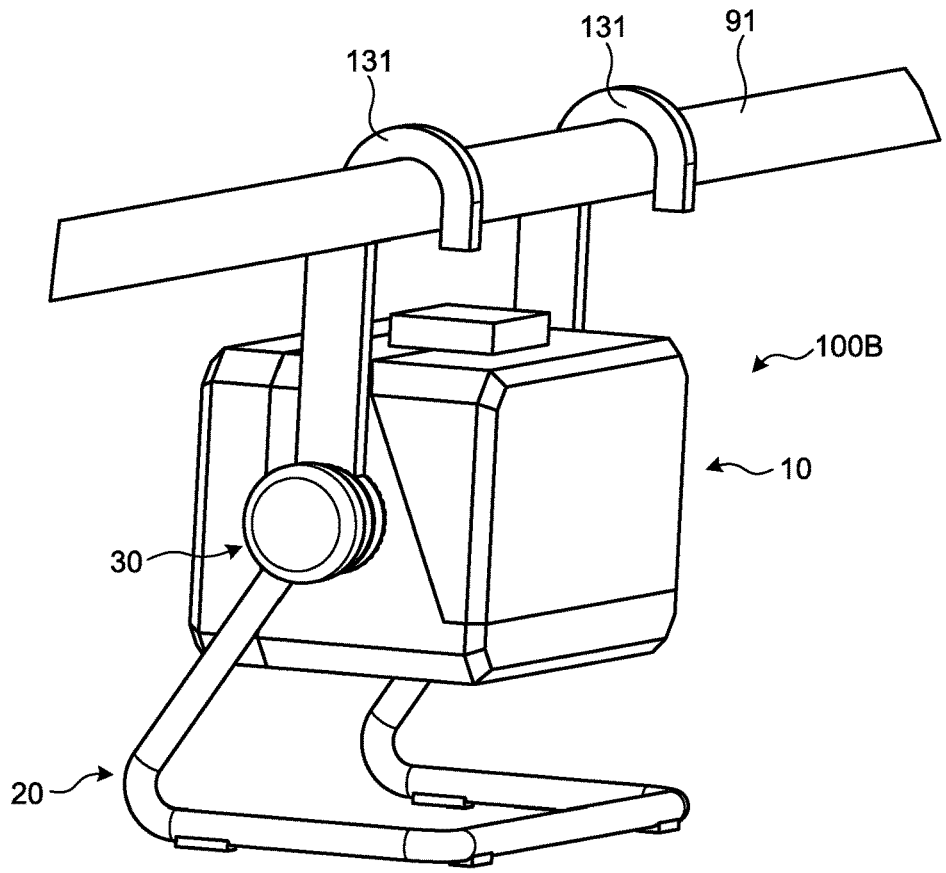
FIG. 12 is a perspective view of a floodlight according to a second embodiment.

FIG. 12 is a perspective view of one example of a floodlight 100B according to this embodiment. The floodlight 100B includes the main-body member 10, the arm 20, the coupling mechanism 30, and the operation device HD, in the same manner as in the embodiment described above. The floodlight 100B according to this embodiment is different from the embodiment described above in having hooks 131, instead of the handle 13 explained in the embodiment. The hooks 131 are coupled to the main-body member 10, and are hooked onto a rod-like member 91.

Figure 13:
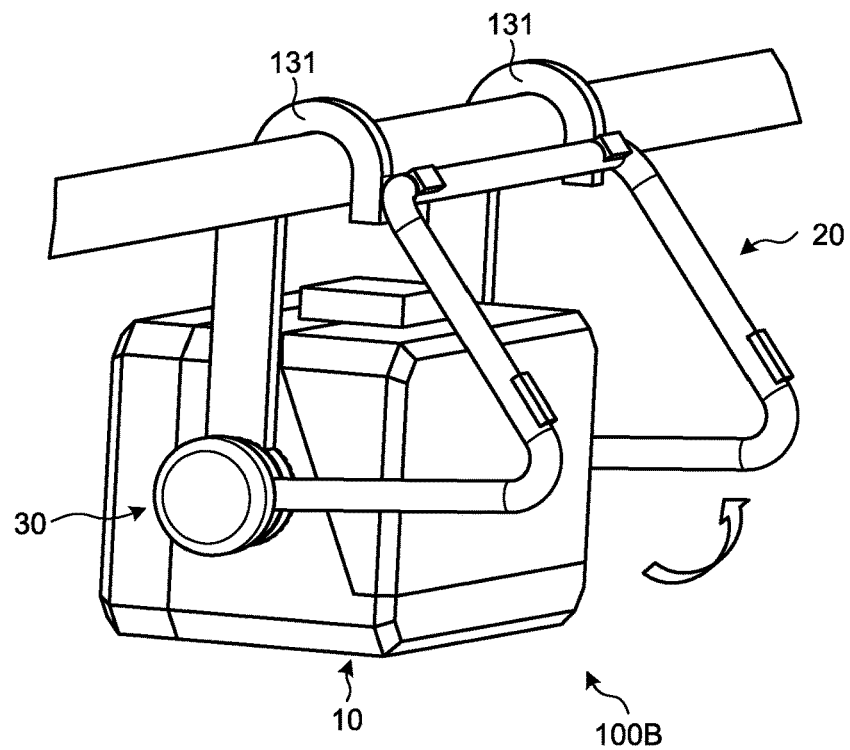
FIG. 13 is a schematic illustrating how the floodlight according to the second embodiment is used.

FIG. 13 is a schematic illustrating how the floodlight 100B according to this embodiment is used. As illustrated in FIG. 13, the arm 20 of the floodlight 100B is pivotable about a pivoting axis that connects the coupling mechanism 30. With the hooks 131 hooked onto the rod-like member 91, the arm 20 is pivoted about the rotational axis AX, and is coupled to the tips of the hooks 131. The arm 20 is coupled to the tips of the hooks 131 in such a manner that the rod-like member 91 is surrounded thereby. According to this embodiment, the hooks 131 is suppressed from unhooking.

Third Embodiment

A third embodiment will now be explained. In the explanation below, the elements that are the same as those according to the embodiment described above are assigned with the same reference signs, and explanations thereof will be simplified or omitted.

Figure 14:
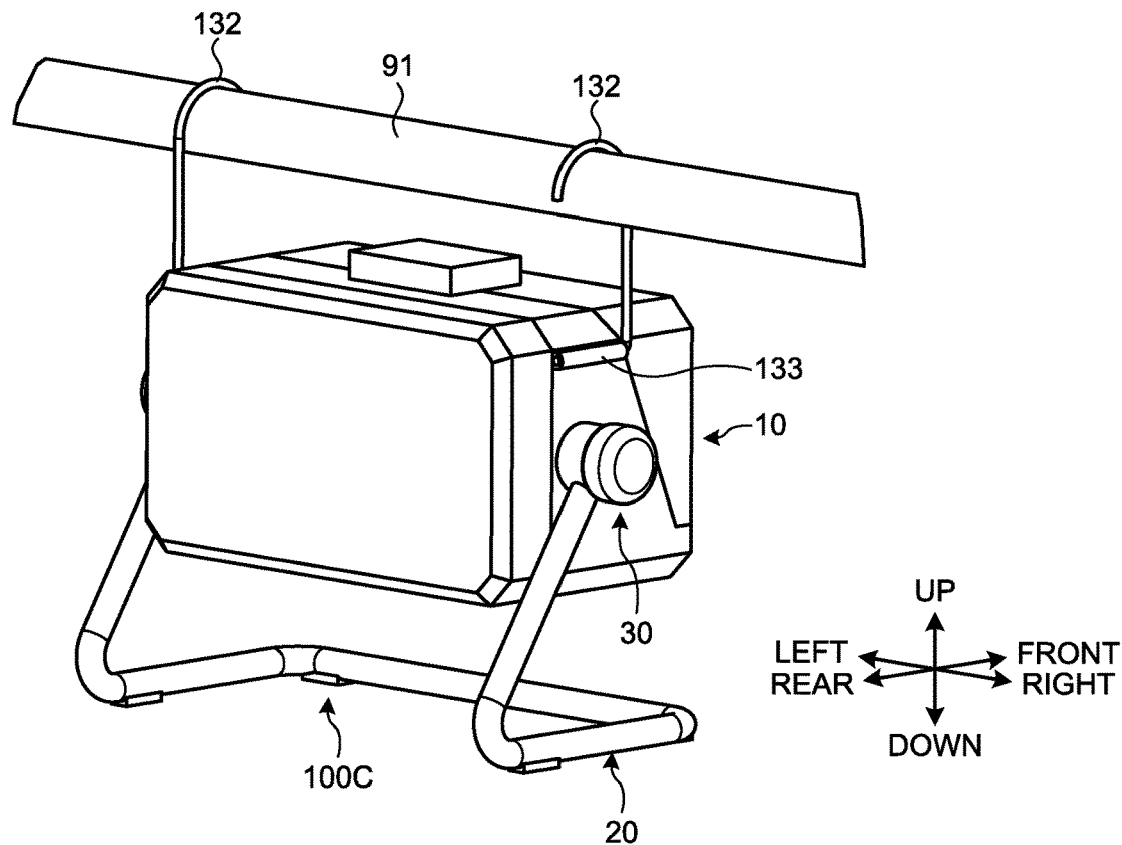
FIG. 14 is a perspective view of a floodlight according to a third embodiment.

FIG. 14 is a perspective view of one example of a floodlight 1000 according to this embodiment. The floodlight 100C includes the main-body member 10, the arm 20, the coupling mechanism 30, and the operation device HD, in the same manner as in the embodiment described above. The floodlight 100C according to this embodiment is different from the embodiment described above in having hooks 132, instead of the handle 13 explained in the embodiment. The hooks 132 can be hanged on the rod-like member 91. The hooks 132 are disposed on the respective lateral sides of the main-body member 10. The hooks 132 are supported by bearings 133 that are pivotable about pivoting axes that are in parallel with a front-and-rear direction. The hook 132 disposed on the right side of the main-body member 10 is bent rearward. The hook 132 disposed on the left side of the main-body member 10 is bents forward.

Figure 15:
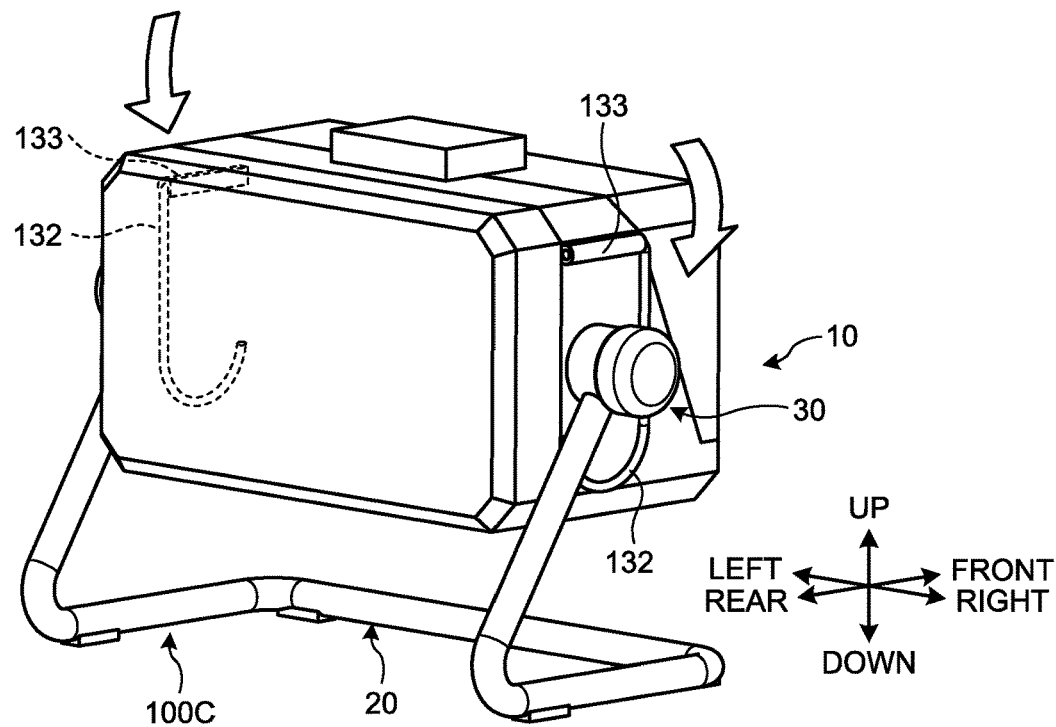
FIG. 15 is a schematic illustrating how the floodlight according to the third embodiment is used.

FIG. 15 is a schematic illustrating how the floodlight 100C according to this embodiment is used. As illustrated in FIG. 15, in the floodlight 100B, after the hooks 132 on the right and the left sides are removed from the rod-like member 91, the hooks 132 can be housed by being rotated downward, below the bearing 133. According to this embodiment, the hooks 132 are suppressed from unhooking, and are efficiently housed.

Fourth Embodiment

A fourth embodiment will now be explained. In the explanation below, the elements that are the same as those according to the embodiment described above are assigned with the same reference signs, and explanations thereof will be simplified or omitted.

Figure 16:
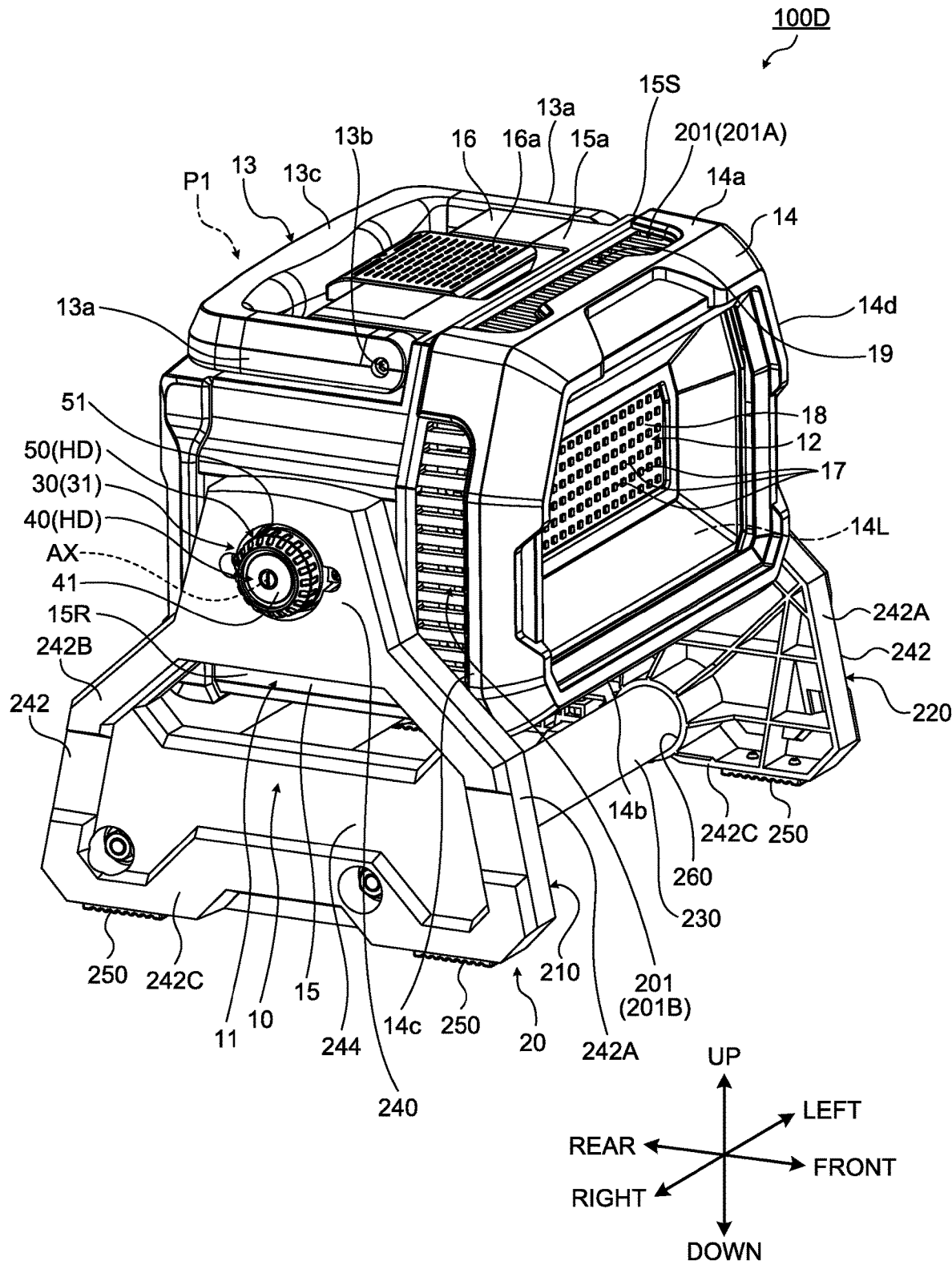
FIG. 16 is a perspective view of a floodlight according to a fourth embodiment.
Figure 17:
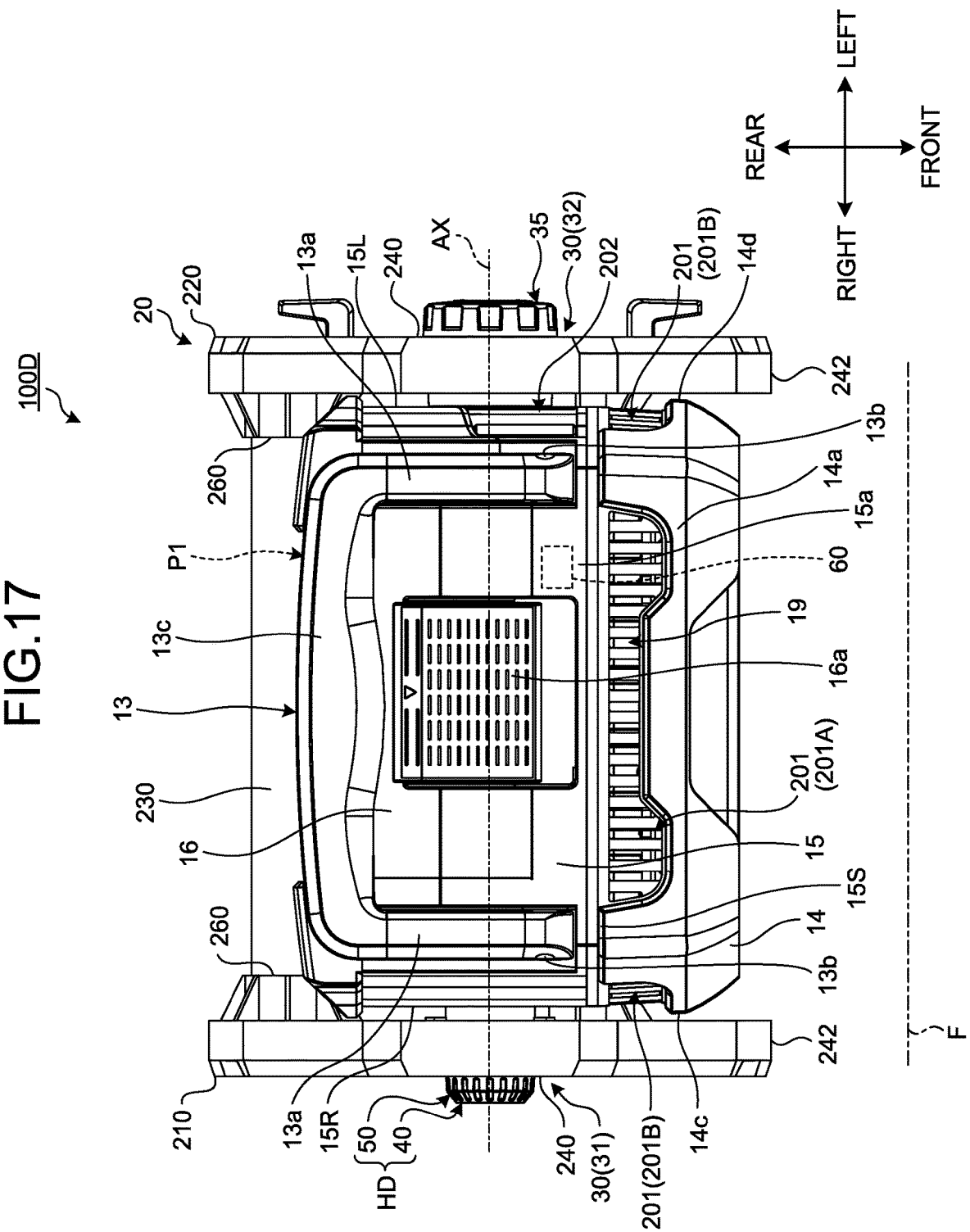
FIG. 17 is a plan view of the floodlight according to the fourth embodiment.

FIG. 16 is a perspective view of one example of a floodlight 100D according to this embodiment. FIG. 17 is a plan view of the one example of the floodlight 100D according to this embodiment. As illustrated in FIGS. 16 and 17, the floodlight 100D includes the main-body member 10, the handle 13 that is coupled to the main-body member 10, the arm 20 that is coupled to the coupling mechanism 30 provided on the side faces of the main-body member 10, and that are pivotable about the rotational axis AX, the operation device HD that is disposed in the coupling mechanism 30 and that is operated to adjust the light emission state of the light emitter unit 12, and the control device 60.

Main-Body Member

The main-body member 10 includes the housing 11, the light emitter unit 12 that is supported by the housing 11, and the heat-radiating member 19 that supports the light emitter unit 12. The housing 11 includes the front cover 14, the rear cover 15, and the battery cover 16. The front cover 14 has a plurality of faces that surrounds the light emitter unit 12 and the heat-radiating member 19. The faces include the top face 14a, the bottom face 14b, the right face 14c, and the left face 14d of the front cover 14.

Vents 201 (first vent) are provided to the top face 14a, the bottom face 14b, the right face 14c, and the left face 14d of the front cover 14. At least a part of the heat-radiating member 19 is exposed via the vents 201. The vents 201 connect the internal space of the front cover 14 to the external space.

In the explanation below, the vents 201 that are provided to the top face 14a and the bottom face 14b will be referred to as vertical vents 201A, as appropriate, and the vents 201 provided to the right face 14c and the left face 14d will be referred to as horizontal vents 201B, as appropriate.

The vertical vent 201As are provided along the left-to-right direction. Each of the vertical vents 201A is elongated in the front-and-rear direction. The vertical vents 201A provided on the bottom face 14b are the same as the vertical vents 201A provided to the top face 14a.

The horizontal vents 201B are provided along the up-and-down direction. Each of the horizontal vents 201B is elongated in the front-and-rear direction. The horizontal vents 201B provided on the left face 14d are the same as the horizontal vents 201B provided on the right face 14c.

The light emitter unit 12 includes the light sources 17, and the control board 18 that supports the light sources 17. The control board 18 includes a driving circuit for driving the light sources 17, and a wiring that is connected to the driving circuit. The light sources 17 are disposed on the front face of the control board 18. The light sources 17 are supported on the front face of the control board 18, and emit light forward, with respect to the control board 18.

The heat-radiating member 19 is a heat sink for radiating the heat generated by the light sources 17. The heat-radiating member 19 is made of a material having a higher thermal conductivity than that of which the control board 18 is made. The heat-radiating member 19 is disposed rearward of the control board 18. The heat-radiating member 19 is disposed rearward of the control board 18 in a manner to be in contact with the rear side of the control board 18.

The control board 18 serves as a support member that supports the light sources 17. The heat-radiating member 19 serves as a support member that supports the light sources 17 via the control board 18. In this embodiment, the support members supporting the light sources 17 include the control board 18 and the heat-radiating member 19. The housing 11 of the main-body member 10 supports the support members that support the light sources 17, in the same manner as in the embodiment described above.

Handle

The handle 13 is attached to the main-body member 10. The handle 13 has the pair of base portions 13a that are coupled to the rear cover 15 via the shaft portion 13b, and the holding portion 13c that connects the pair of base portions 13a, in the same manner as in the embodiment described above. The handle 13 is pivotable about the shaft portion 13b. The handle 13 can be moved between the housed position P1 and the standing position P2 (see FIG. 21, for example), by being pivoted about the shaft portion 13b.

With the handle 13 positioned at the housed position P1, the handle 13 restricts the rearward movement of the battery cover 16 (open direction). With the handle 13 positioned at the standing position P2, a worker can hold the handle 13 smoothly.

Arm

The arm 20 is coupled to the coupling mechanism 30 provided on the side faces of the main-body member 10, and is pivotable about the rotational axis AX. The arm 20 includes a first arm 210 that is coupled to the first side face 15R of the main-body member 10 via the first coupling mechanism 31, a second arm 220 that is coupled to the second side face 15L of the main-body member 10 via the second coupling mechanism 32, and a rod 230 that couples the first arm 210 and the second arm 220.

The first arm 210 has a base portion 240 that is disposed around the first coupling mechanism 31, and that faces the first side face 15R, an annular portion 242 that is coupled to the base portion 240 and has a grounding portion 250, and a plate portion 244 that is disposed inside the annular portion 242. The base portion 240, the annular portion 242, and the plate portion 244 are integrated.

The base portion 240 is coupled to the first side face 15R of the rear cover 15 via the first coupling mechanism 31. The base portion 240 has a plate-like shape, and faces at least a part of the first side face 15R. The base portion 240 is disposed around the first coupling mechanism 31.

The annular portion 242 has a first section 242A that extends forward and downward from the front part of the base portion 240 along the first side face 15R, a second section 242B that extends rearward and downward from the rear part of the base portion 240 along the first side face 15R, and a third section 242C that connects the lower end of the first section 242A and the lower end of the second section 242B.

The grounding portion 250 is provided on the bottom face of the third section 242C. The grounding portion 250 includes a pad member made of rubber, for example, and two grounding portions 250 are provided on the bottom face of the third section 242C, in the front-and-rear direction.

The plate portion 244 is disposed inside the annular portion 242. The plate portion 244 of the first arm 210 has an outer face facing rightward, and an inner face facing leftward. On the inner face of the plate portion 244, a plurality of ribs are provided. A coupler 260 to which the rod 230 is coupled is also provided on the inner face of the plate portion 244.

Because the second arm 220 has the same structure as the first arm 210, an explanation of the second arm 220 will be omitted.

The rod 230 couples the first arm 210 and the second arm 220. The central axis of the rod 230 is substantially in parallel with the rotational axis AX. The right end of the rod 230 is coupled to the coupler 260 of the first arm 210. The left end of the rod 230 is coupled to the coupler 260 of the second arm 220. In this embodiment, two rods 230 are provided. The first arm 210 and the second arm 220 are coupled to each other via the rods 230. Therefore, the first arm 210 and the second arm 220 are pivotable together about the rotational axis AX.

First Coupling Mechanism and Operation Device

The floodlight 100D includes the first coupling mechanism 31 and the operation device HD in the same manner as in the embodiment described above. Because the first coupling mechanism 31 and the operation device HD provided to the floodlight 100D have the same structures as those of the first coupling mechanism 31 and the operation device HD of the floodlight 100A described above, explanations of the first coupling mechanism 31 and the operation device HD of the floodlight 100D will be omitted.

Second Coupling Mechanism

Figure 18:
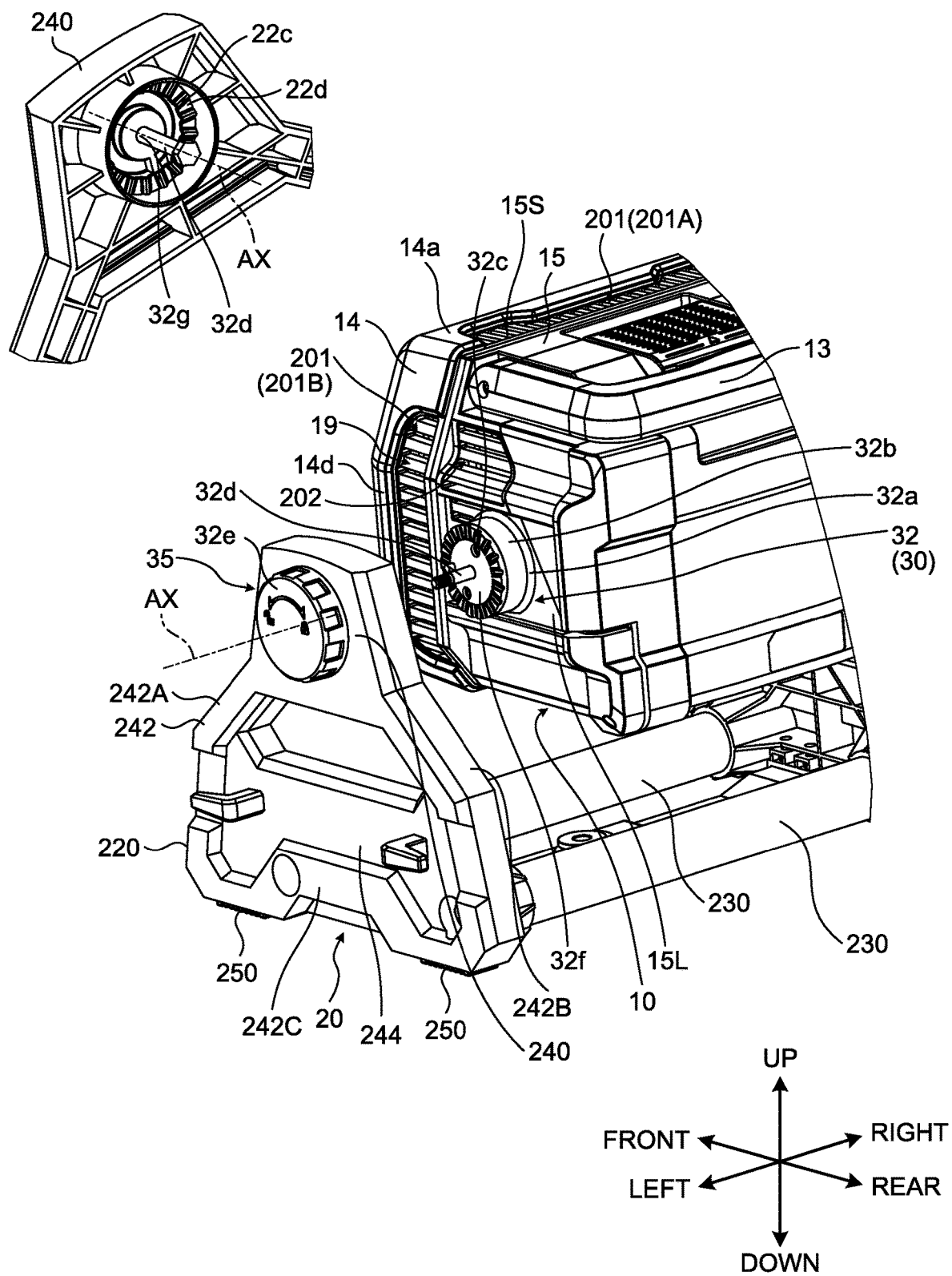
FIG. 18 is a perspective view of a second coupling mechanism according to the fourth embodiment.

FIG. 18 is a perspective view of the second coupling mechanism 32 according to the embodiment. As illustrated in FIG. 18, the base portion 240 of the second arm 220 is coupled to the second coupling mechanism 32. The base portion 240 includes the cam 22c. The cam 22c restricts pivoting movements of the arm 20. The cam 22c is provided to the right tip end surface 22d of the base portion 240. FIG. 18 also illustrates the base portion 240 seen from the side of the tip end surface 22d. The cam 22c includes a plurality of protrusions disposed on the tip end surface 22d around the rotational axis AX.

The second coupling mechanism 32 includes the fastening mechanism 35 for fastening the arm 20 to the main-body member 10. The fastening mechanism 35 includes the flange portion 32a, the columnar portion 32b, the cam 32c, the screw portion 32d, and the fastening member 32e. The flange portion 32a is fastened to the second side face 15L. The columnar portion 32b protrudes leftward from the flange portion 32a. The central axis of the columnar portion 32b is coincident with the rotational axis AX.

The cam 32c restricts pivoting movements of the arm 20. The cam 32c is provided on the tip end surface 32f of the columnar portion 32b. The cam 32c has a plurality of protrusions disposed on the tip end surface 32f around the rotational axis AX.

The screw portion 32d protrudes leftward from the tip end surface 32f of the columnar portion 32b. The left end of the screw portion 32d has a male thread.

The fastening member 32e has the screw hole 32g. The screw portion 32d is inserted into the screw hole 32g, and is enmeshed with the screw hole 32g. The fastening member 32e is enmeshed with the screw portion 32d from the left side of the base portion 240. The base portion 240 and the columnar portion 32b are fastened to each other by inserting the left end of the screw portion 32d into the screw hole 32g in the fastening member 32e, and rotating the fastening member 32e in one direction about the rotational axis AX. The fastening between the base portion 240 and the columnar portion 32b is loosened by rotating the fastening member 32e about the rotational axis AX in the other direction.

With the base portion 240 and the columnar portion 32b fastened to each other, the cam 22c of the base portion 240 and the cam 32c of the second coupling mechanism 32 are enmeshed with each other. As a result, the rotations of the base portion 240 about the rotational axis AX are restricted.

With the fastening between the base portion 240 and the columnar portion 32b loosened, the mesh between the cam 22c of the base portion 240 and the cam 32c of the second coupling mechanism 32 is released. As a result, the base portion 240 can be rotated about the rotational axis AX. Furthermore, the position of the arm 20 in the rotating direction about the rotational axis AX can be adjusted.

Heat-Radiating Member

FIG. 19 is a perspective view of the heat-radiating member 19 according to the embodiment. FIG. 19 illustrates the heat-radiating member 19 housed inside the front cover 14, from a viewpoint on the rear side. As illustrated in FIG. 19, the heat-radiating member 19 includes the support panel 19a and fins 19f. The support panel 19a supports the control board 18. The control board 18 is in contact with the support panel 19a.

The fins 19f are supported by the rear face of the support panel 19a, and protrude rearward from the support panel 19a. The fins 19f each have a plate-like shape extending in the up-and-down direction, and are provided with a space therebetween, in the left-to-right direction.

In this embodiment, the fin 19f is made by bending a metallic plate twice. In the example illustrated in FIG. 19, 30 fins 19f are provided. These 30 fins 19f are formed by bending 15 metallic plates.

Each of the fins 19f has through holes 19h penetrating in the left-to-right direction. The through holes 19h are provided to each of the fins 19f with a space therebetween. In the example illustrated in FIG. 19, seven through holes 19h are provided.

The front cover 14 is disposed in a manner surrounding the light emitter unit 12 and the heat-radiating member 19. The vertical vents 201A are provided on the one side (above) of the fins 19f and on the other side (below) in the up-and-down direction. The horizontal vents 201B are provided on one side (right side) of the fins 19f and on the other side (left side) in the left-to-right direction.

Battery Mounting Unit

Figure 20:
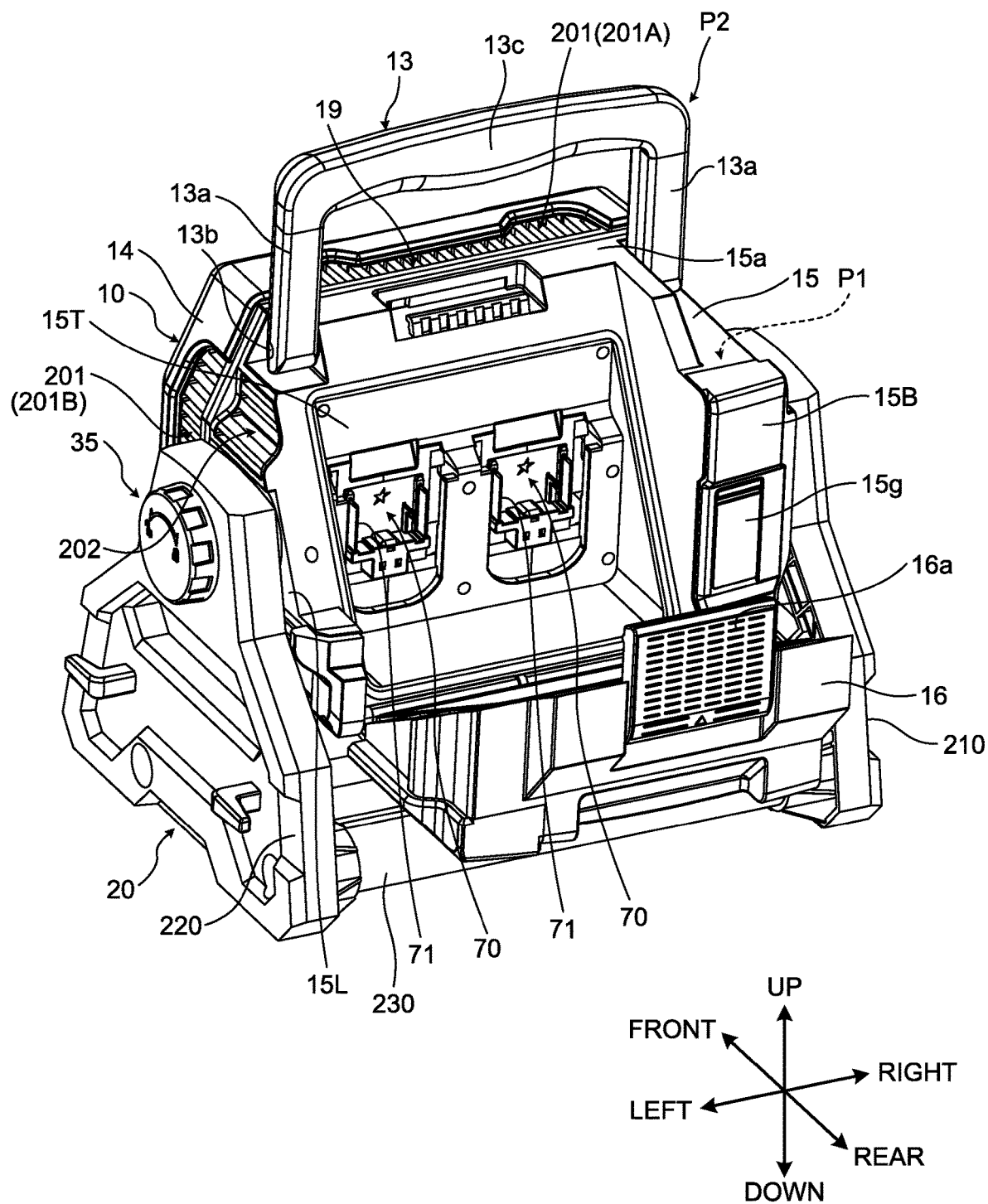
FIG. 20 is a perspective view of the floodlight according to the fourth embodiment, seen from the rear side.
Figure 21:
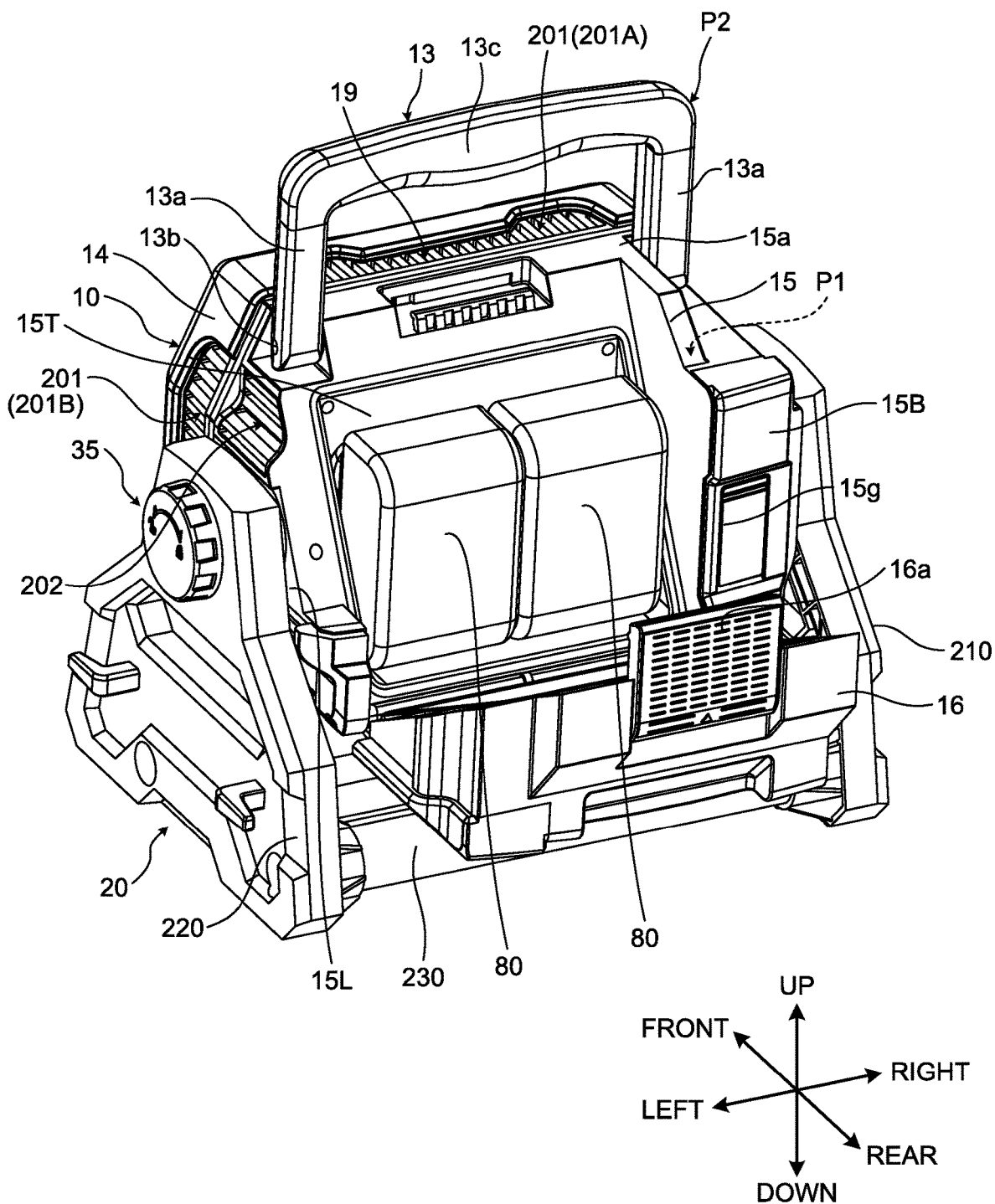
FIG. 21 is a perspective view of the floodlight according to the fourth embodiment, seen from the rear side.

FIGS. 20 and 21 are perspective views of the floodlight 100D according to this embodiment seen from the rear side, with the battery cover 16 pivoted rearward (open direction). The main-body member 10 includes the battery mounting unit 70 on which the electric-tool battery 80 is mounted. The battery mounting unit 70 is covered with the battery cover 16. When the electric-tool battery 80 is to be mounted on the battery mounting unit 70 or when the electric-tool battery 80 is to be removed from the battery mounting unit 70, the battery cover 16 is pivoted rearward. FIG. 20 illustrates the battery mounting unit 70 with the electric-tool battery 80 removed. FIG. 21 illustrates the battery mounting unit 70 with the electric-tool battery 80 mounted.

When the battery cover 16 is to be pivoted rearward, the handle 13 is lifted to the standing position P2. By removing the latch 16a after the handle 13 is positioned at the standing position 22, and pivoting the battery cover 16 rearward, the battery mounting unit 70 becomes exposed, as illustrated in FIG. 20. When the battery cover 16 is pivoted forward (in the direction in which the battery cover 16 closes), the latch 16a is moved to the position above the stepped portion 15a, and the battery mounting unit 70 is covered with the battery cover 16.

The rear cover 15 has the second wall 15T. The battery mounting unit 70 is disposed on the second wall 15T. Two battery mounting units 70 are on the second wall 15T. The battery mounting unit 70 has the guide portion 71 for guiding the electric-tool battery 80. The electric-tool battery 80 is mounted on the battery mounting unit 70 while being guided by the guide portion 71. The light emitter unit 12 including the light sources 17, a fan 200, which will be described later, and the control device 60 are driven by the power supplied from the electric-tool battery 80.

Power Supply Cable

Figure 22:
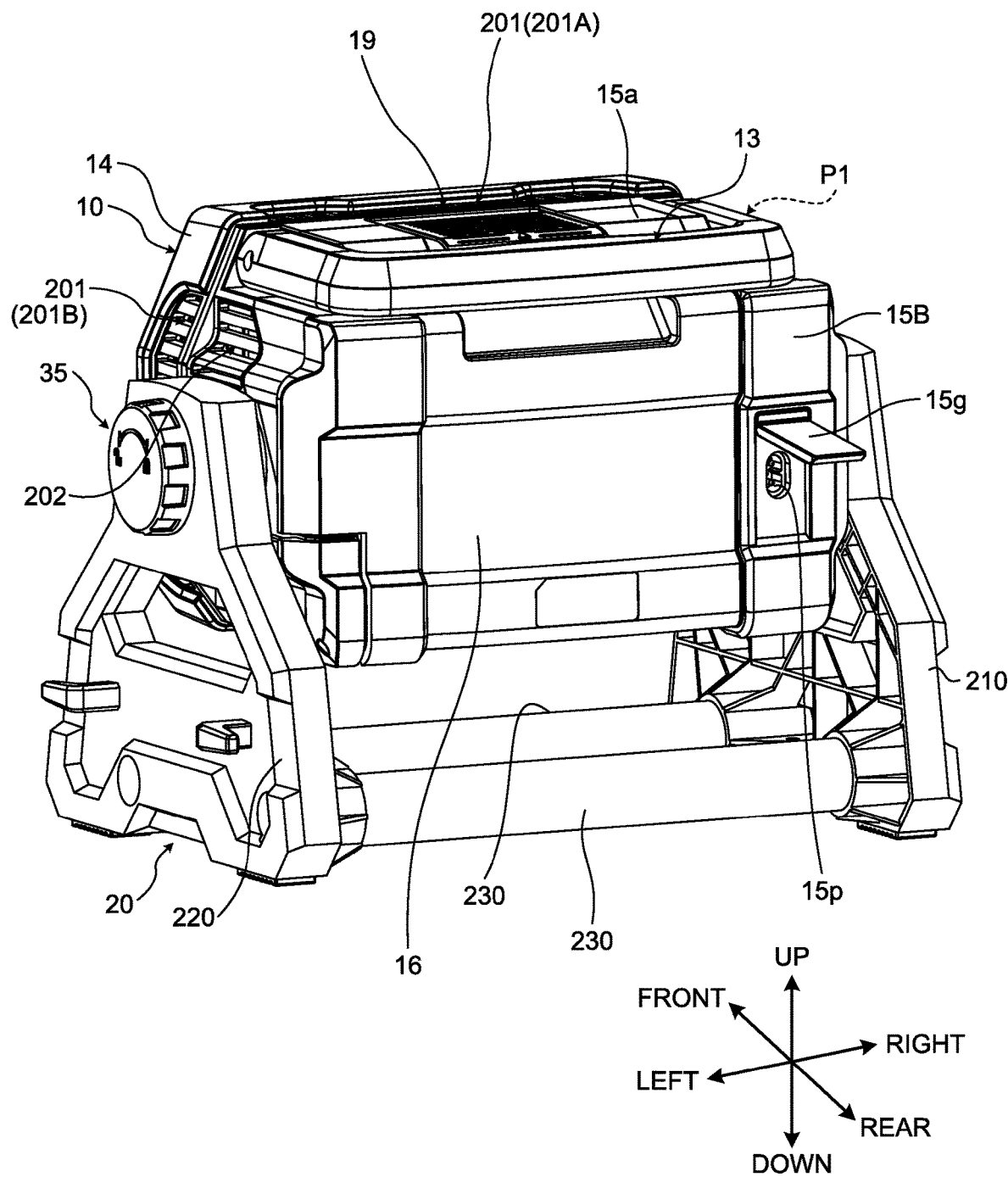
FIG. 22 is a perspective view of the floodlight according to the fourth embodiment, seen from the rear side.

FIG. 22 is a perspective view of the floodlight 100D according to this embodiment seen from the rear side, with the connecting portion cover 15g opened. As illustrated in FIG. 22, the connector connecting portion 15p is provided on the rear face 15B of the rear cover 15. The connector 15t of the power supply cable 15r is connected to the connector connecting portion 15p, in the same manner as in the embodiment described above. The connecting portion cover 15g is capable of covering the connector connecting portion 15p.

Fan

Figure 24:
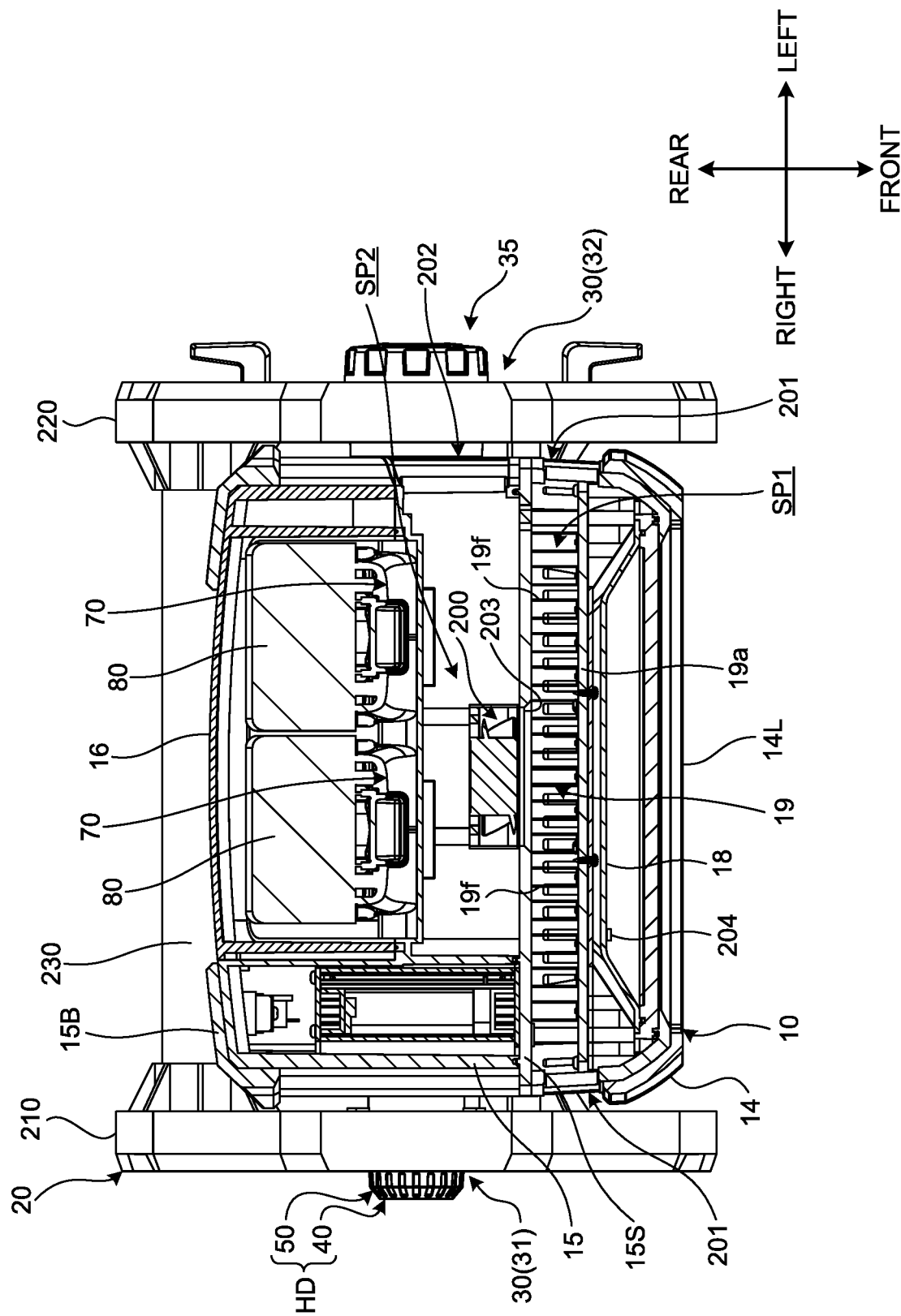
FIG. 24 is a sectional view of the floodlight according to the fourth embodiment.

FIGS. 23 and 24 are sectional views of the floodlight 100D according to this embodiment. FIG. 25 is a perspective view of the floodlight 100D according to this embodiment.

FIG. 23 illustrates a cross section in a direction in parallel with a first predetermined plane including a front-to-rear axis that intersects perpendicularly with rear face of the support panel 19a and an up-and-down axis that is parallel with the rear face of the support panel 19a. FIG. 24 illustrates a cross section in a direction in parallel with a second predetermined plane including the front-to-rear axis that intersects perpendicularly with the rear face of the support panel 19a and a left-to-right axis that is in parallel with the rear face of the support panel 19a. FIG. 25 illustrates the floodlight 100D with a part thereof cut off.

The floodlight 100D includes a fan 200 for generating an air flow on the surface of the heat-radiating member 19 and cooling the light sources 17. The fan 200 is disposed rearward of the heat-radiating member 19, at a position facing the heat-radiating member 19.

The housing 11 has an internal space in which the light emitter unit 12 including the light sources 17 and the control board 18, the heat-radiating member 19, the fan 200, and the electric-tool battery 80 are housed. The internal space of the housing 11 is partitioned into a first internal space SP1 in which the light emitter unit 12 and the heat-radiating member 19 are housed, and a second internal space SP2 in which the fan 200 is disposed. The first internal space SP1 and the second internal space SP2 are partitioned from each other by the first wall 15S of the rear cover 15.

The first internal space SP1 is defined by the front cover 14 and the first wall 15S of the rear cover 15. The second internal space SP2 is defined by the first wall 15S and the second wall 15T of the rear cover 15.

The first wall 15S has an opening 203 that connects the first internal space SP1 and the second internal space SP2. The fan 200 faces the heat-radiating member 19 via the opening 203.

The vents 201 are provided in a manner connecting the first internal space SP1 and the external space of the housing 11. The housing 11 also has vents 202 (second vent) that connect the second internal space SP2 and the external space of the housing 11.

The vents 202 are provided to the rear cover 15. The vents 202 are provided on the left side of the fan 200. The vents 202 are provided along the up-and-down direction. Each of the vents 202 is elongated in the front-and-rear direction. The vents 202 may also be provided on the right side of the fan 200, above the fan 200, or below the fan 200.

The floodlight 100D includes a temperature sensor 204 that detects the temperature of the control board 18. A detection signal from the temperature sensor 204 is output to the control device 60. The detection signal from the temperature sensor 204 indicates the temperature of the control board 18, detected by the temperature sensor 204.

Control Device

Figure 26:
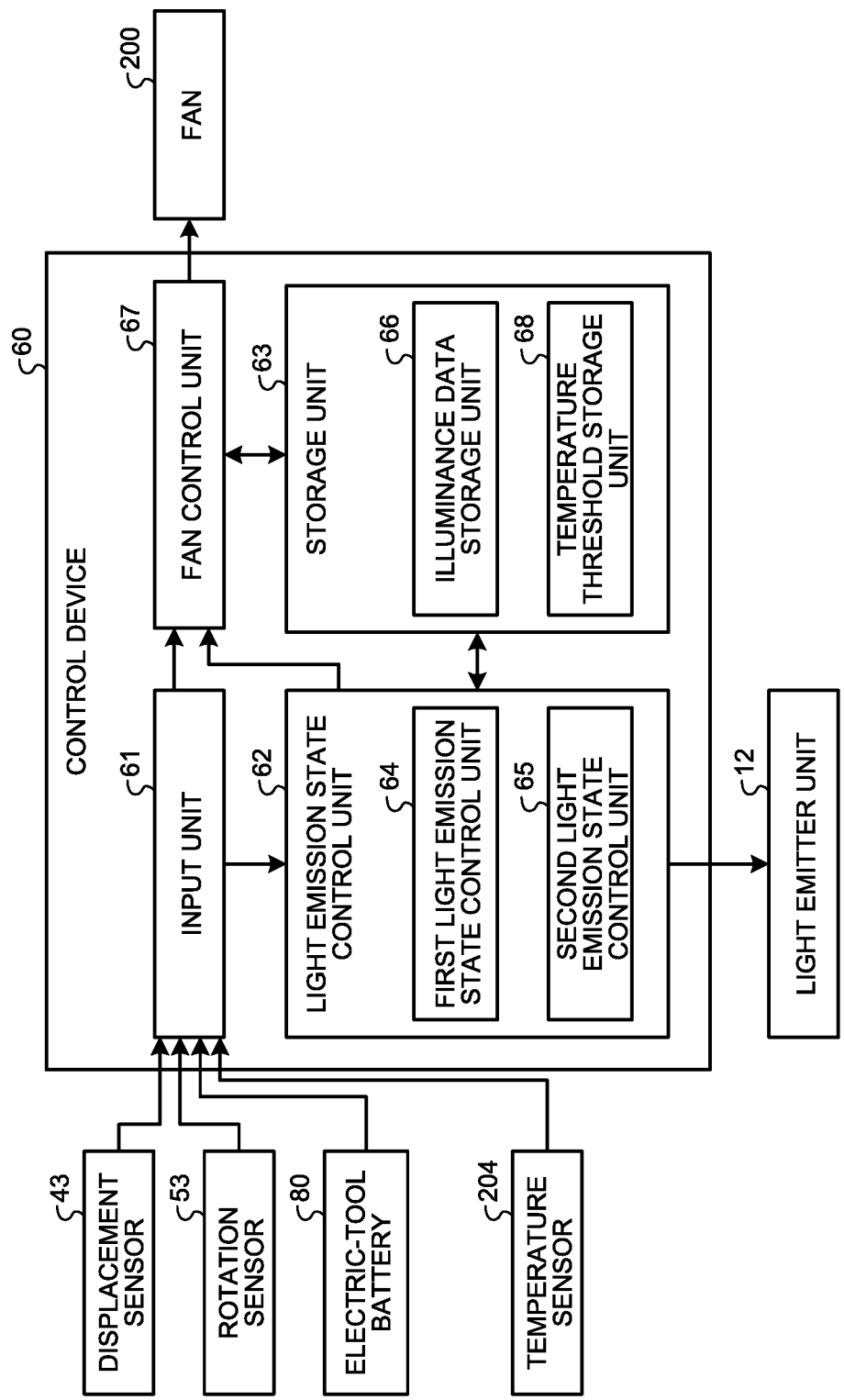
FIG. 26 is a functional block diagram illustrating a control device according to the fourth embodiment.

FIG. 26 is a functional block diagram illustrating the control device 60 according to the embodiment. The control device 60 includes the input unit 61, the light emission state control unit 62, the storage unit 63, and a fan control unit 67.

The input unit 61 acquires input signals. The input signals acquired by the input unit 61 include a detection signal from the displacement sensor 43, a detection signal from the rotation sensor 53, a remaining charge signal from the electric-tool battery 80, and a detection signal from the temperature sensor 204.

The light emission state control unit 62 controls the light emission state of the light sources 17 based on the amount by which the operation device HD is operated.

The first light emission state control unit 64 controls the light emission state of the light sources 17 based on the detection signal from the displacement sensor 43 having detected the amount by which the switch 41 is operated (the amount of displacement). The light emission state control performed by the first light emission state control unit 64 includes the control for causing the light sources 17 to switch between the on state, the blinking state, and the off state.

The second light emission state control unit 65 controls the light emission state of the light sources 17 based on the detection signal from the rotation sensor 53 having detected the amount by which the dial 51 is operated (the rotational amount). The light emission state control performed by the second light emission state control unit 65 includes the control of illuminance of the light emitted from the light sources 17.

The fan control unit 67 outputs a control signal for controlling the fan 200. The control of the fan 200, the control being performed by the fan control unit 67, includes control for switching the fan 200 to drive and to stop. The control of the fan 200, the control being performed by the fan control unit 67, also includes control of the rotational speed of the fan 200. The fan 200 includes a fan motor, and vanes that are rotated by being driven by the fan motor. The fan control unit 67 controls the fan 200 by outputting a control signal to the fan motor.

The fan control unit 67 controls driving of the fan 200 based on the detection signal from the temperature sensor 204. The storage unit 63 includes a temperature threshold storage unit 68 storing therein a temperature threshold related to the temperature of the control board 18. The temperature threshold is set in advance, and is stored in the temperature threshold storage unit 68. The fan control unit 67 compares the temperature of the control board 18 detected by the temperature sensor 204, with the temperature threshold, and drives the fan 200 when it is determined that the temperature of the control board 18 is equal to or higher than the temperature threshold, and stops the fan 200 when it is determined that the temperature of the control board 18 is lower than the temperature threshold.

The fan control unit 67 may be configured to control the rotational speed of the fan 200 based on the temperature of the control board 18 detected by the temperature sensor 204. The fan control unit 67 may set a higher rotational speed to the fan 200 when the temperature of the control board 18 is higher, and set a lower rotational speed to the fan 200 when the temperature of the control board 18 is lower.

The fan control unit 67 may be configured to control driving of the fan 200 based on the amount by which the operation device HD is operated. For example, based on the detection signal from the displacement sensor 43 having detected the amount by which the switch 41 is operated (the amount of displacement), the fan control unit 67 may drive the fan 200 when it is determined that the light sources 17 are in the on state, and stop the fan 200 when it is determined that the light sources 17 are in the off state. Furthermore, based on the detection signal from the rotation sensor 53 having detected the amount by which the dial 51 is operated (the rotational amount), the fan control unit 67 may increase the rotational speed of the fan 200 when the illuminance of the light emitted from the light sources 17 is higher, and decrease the rotational speed of the fan 200 when the illuminance of the light emitted from the light sources 17 is lower.

The fan control unit 67 may be configured to control driving of the fan 200 based on the remaining charge signal output from the electric-tool battery 80. For example, the fan control unit 67 may drive the fan 200 when it is determined that the temperature of the control board 18 is equal to or higher than the temperature threshold, and that the remaining charge in the electric-tool battery 80 is equal to or higher than a remaining charge threshold, and stop the fan 200 when it is determined that the temperature of the control board 18 is equal to or higher than the temperature threshold but the remaining charge in the electric-tool battery 80 is lower than the remaining charge threshold.

Furthermore, the fan control unit 67 may be configured to set a higher rotational speed to the fan 200 when the remaining charge in the electric-tool battery 80 is higher, and to set a lower rotational speed to the fan 200 when the remaining charge in the electric-tool battery 80 is lower, while the temperature of the control board 18 is equal to or higher than the temperature threshold.

Effects

Effects of the fan 200 according to the embodiment will now be explained. FIG. 27 is a schematic illustrating effects of the fan 200 according to the embodiment, and is a schematic sectional view of a part of the floodlight 100D. FIG. 27(A) illustrates a cross section in a direction in parallel with the second predetermined plane including the front-to-rear axis that intersects perpendicularly with the rear face of the support panel 19a, and the left-to-right axis that is in parallel with rear face of the support panel 19a. FIG. 27(B) is a cross section in a direction in parallel with the first predetermined plane including the front-to-rear axis that intersects perpendicularly with the rear face of the support panel 19a and the up-and-down axis that is in parallel with the rear face of the support panel 19a.

When the light sources 17 are driven, the light sources 17 become heated. As the light sources 17 are heated, the temperature of the control board 18 increases. The temperature of the control board 18 is detected by the temperature sensor 204. The temperature sensor 204 outputs a detection signal indicating the temperature of the control board 18, to the control device 60.

The input unit 61 acquires the detection signal from the temperature sensor 204. The fan control unit 67 compares the temperature of the control board 18 detected by the temperature sensor 204, with the temperature threshold stored in the temperature threshold storage unit 68, and starts driving the fan 200 if it is determined that the temperature of the control board 18 is equal to or higher than the temperature threshold.

In this embodiment, the fan 200 supplies a gas to the heat-radiating member 19. When the fan 200 is driven, the gas in the external space of the housing 11 enters the second internal space SP2 via the vents 202. The fan 200 supplies the gas to the heat-radiating member 19 via the opening 203 on the first wall 15S.

As the fan 200 is driven, at least a part of the gas in the second internal space SP2 enters the first internal space SP1 via the opening 203. As the fan 200 is driven, an air flow is generated on at least a part of the surface of the heat-radiating member 19. The gas brought into contact with the surface of the heat-radiating member 19 deprives the heat from the heat-radiating member 19.

As illustrated in FIG. 27(A), the fins 19f are disposed along the left-to-right direction. In this embodiment, the through holes 19h are provided to each of the fins 19f. Therefore, the gas supplied to the heat-radiating member 19 by the fan 200 can flow smoothly in the left-to-right direction via the through holes 19h.

The horizontal vents 201B are provided on the one side (right side) of the fins 19f, and on the other side (left side), in the left-to-right direction. The gas having flowed in the left-to-right direction via the through hole 19h is allowed to flow out to the external space of the housing 11, via the horizontal vents 201B.

As illustrated in FIG. 27(B), the fin 19f has a plate-like shape extending in the up-and-down direction. Therefore, the gas supplied to the heat-radiating member 19 by the fan 200 can flow smoothly in the up-and-down directions, along the surfaces of the fins 19f.

The vertical vents 201A are provided on one side of (above) the fins 19f, and on the other side (below), in the up-and-down direction. The gas having flowed in the up-and-down directions along the surfaces of the fins 19f can flow out to the external space of the housing 11 via the vertical vents 201A.

Advantageous Effects

As explained above, according to this embodiment, the fan 200 generates an air flow on the surface of the heat-radiating member 19 supporting the light sources 17. The gas flowing in contact with the surface of the heat-radiating member 19 deprives heat from the heat-radiating member 19. Therefore, excessive heating of the light sources 17 is suppressed.

The light sources 17 are supported on the front face of the control board 18, and emit light forward, with respect to the control board 18. The fan 200 is disposed rearward of the heat-radiating member 19, at a position facing the heat-radiating member 19. Because the fan 200 is not disposed on the light path of the light emitted from the light sources 17, the floodlight 100D can illuminate an object to be illuminated, smoothly. Furthermore, because the fan 200 is disposed at a position facing the heat-radiating member 19, gas can be supplied sufficiently to the heat-radiating member 19.

The internal space of the housing 11 is partitioned by the first wall 15S into the first internal space SP1 and the second internal space SP2. The light sources 17, the control board 18, and the heat-radiating member 19 are disposed inside the first internal space SP1, and the fan 200 is disposed inside the second internal space SP2. The first internal space SP1 and the second internal space SP2 are connected to each other only via the opening 203. Because the first internal space SP1 and the second internal space SP2 are partitioned, the entry of a foreign substance, having entered the second internal space SP2, into the first internal space SP1 is suppressed, for example. Furthermore, by sealing the first internal space SP1 with a seal member, the entry of a foreign substance into the first internal space SP1 is suppressed effectively.

The second internal space SP2 in which the fan 200 is disposed is connected to the external space of the housing 11 via the vents 202. With this configuration, when the fan 200 is driven, the gas in the external space flows into the second internal space SP2 via the vents 202. Therefore, the fan 200 can supply the gas smoothly into the heat-radiating member 19.

The first internal space SP1 in which the light sources 17, the control board 18, and the heat-radiating member 19 are disposed is connected to the external space of the housing 11 via the vents 201. With this configuration, the gas having deprived the heat from the heat-radiating member 19 can flow out to the external space of the housing 11 via the vents 201. Because the gas heated by being brought into contact with the heat-radiating member 19 is discharged smoothly to the external space of the housing 11 via the vents 201, a reduction in the efficiency at which the light sources 17 are cooled is suppressed.

The fin 19f has a plate-like shape extending in the up-and-down direction. Therefore, the gas supplied to the heat-radiating member 19 by the fan 200 can flow smoothly in the up-and-down directions along the surfaces of the fins 19f. The vertical vents 201A are provided above and below the fins 19f. The gas having flowed in the up-and-down directions along the surfaces of the fins 19f can smoothly flow out to the external space of the housing 11 via the vertical vents 201A.

The fins 19f have the through holes 19h penetrating in the left-to-right direction. Therefore, the gas supplied by the fan 200 to the heat-radiating member 19 can flow smoothly in the left-to-right directions via the through holes 19h. The horizontal vents 201B are provided on the right side and the left side of the fins 19f. The gas having flowed in the left-to-right directions via the through holes 19h can smoothly flow out to the external space of the housing 11 via the horizontal vents 201B.

In this embodiment, the temperature of the control board 18 is detected by the temperature sensor 204, and driving of the fan 200 is controlled based on the detection signal from the temperature sensor 204. Because the fan 200 is not driven when the light sources 17 are not excessively heated, and when it is not necessary to cool the light sources 17, the power consumption by the fan 200 is suppressed.

Driving of the fan 200 may be controlled based on the amount by which the operation device HD for adjusting the light emission state of the light sources 17 is operated. Depending on the light emission state of the light sources 17, it is sometimes not necessary to cool the light sources 17, because the light sources 17 are not excessively heated. By not to drive the fan 200 in circumstances in which it is not necessary to cool the light sources 17, the power consumption by the fan 200 is suppressed.

Even in circumstances in which it is necessary to cool the light sources 17, the power consumption of the electric-tool battery 80 can be suppressed by reducing the rotational speed of the fan 200, or stopping the fan 200 when the remaining charge of the electric-tool battery 80 is low.

In this embodiment, the fan 200 is explained to supply gas to the heat-radiating member 19. The fan 200 may also be configured to recover gas from the heat-radiating member 19. In other words, the fan 200 may suction the gas around the heat-radiating member 19. By causing the fan 200 to suction gas, an air flow is generated on the surface of the heat-radiating member 19, so that the light sources 17 are cooled thereby.

In this embodiment, the heat-radiating member 19 may be omitted. Even in a configuration in which the heat-radiating member 19 is omitted, by causing the fan 200 to generate an air flow on the surface of the control board 18, the light sources 17 can be cooled effectively.

Another Embodiment

Explained in the embodiment described above is an example in which the switch mechanism 40 and the dial mechanism 50 are disposed in the first coupling mechanism 31 of the coupling mechanism 30, but the embodiment is not limited thereto. For example, one of the switch mechanism 40 and the dial mechanism 50 may be disposed in the first coupling mechanism 31, and the other may be disposed in the second coupling mechanism 32.

REFERENCE SIGNS LIST 10 main-body member
11 housing
12 light emitter unit
13 handle
13a base portion
13b shaft portion
13c holding portion
14 front cover
14a top face
14b bottom face
14c right face
14d left face
14K opening
14L lens
15 rear cover
15B rear face
15L second side face
15R first side face
15S first wall
15T second wall
15a stepped portion
15c insertion hole
15d bearing
15e wall
15f seal member
15g connecting portion cover
15p connector connecting portion
15r power supply cable
15t connector
15u screw member
16 battery cover
16a latch
17 light source
18 control board
19 heat-radiating member
19a support panel
19b fin
19c fin
19d fastening member inserting portion
19e pass-through portion
19f fin
19h through hole
20 arm
21 first base portion
22 second base portion
22a columnar portion
22b rod-like portion
22c cam
22d tip end surface
22e through hole
23 annular portion
23a first section
23b second section
23c third section
23d cable-winding portion
23e connecting portion
24 curved portion
25 curved portion
26 curved portion
27 curved portion
30 coupling mechanism
31 first coupling mechanism 31a flange portion
31b cylindrical portion
32 second coupling mechanism
32a flange portion
32b columnar portion
32c cam
32d screw portion
32e fastening member
32f tip end surface
32g screw hole
35 fastening mechanism
40 switch mechanism
41 switch
42 moving member
43 displacement sensor
50 dial mechanism
51 dial
52 rotating member
53 rotation sensor
60 control device
61 input unit
62 light emission state control unit
63 storage unit
64 first light emission state control unit
65 second light emission state control unit
66 illuminance data storage unit
67 fan control unit
68 temperature threshold storage unit
70 battery mounting unit
71 guide portion
80 electric-tool battery
90 tripod stand
91 rod-like member
100A floodlight
100B floodlight
100C floodlight
100D floodlight
131 hook
132 hook
133 bearing
200 fan
201 vent (first vent)
201A vertical vent (first vent)
201B horizontal vent
202 vent (second vent)
203 opening
204 temperature sensor
210 first arm
220 second arm
230 rod
240 base portion
242 annular portion
242A first section
242B second section
242C third section
244 plate portion
250 grounding portion
260 coupler
AX rotational axis
F illuminance reference surface
K1 first space
K2 second space
P1 housed position
P2 standing position
HD operation device

The invention claimed is:

1. A floodlight comprising:
a housing having an internal space;
a wall that partitions the internal space into a first internal space and a second internal space, and has an opening that connects the first internal space and the second internal space;
one or more first vents that connect the first internal space to an external space;
a second vent that connects the second internal space to the external space;
a support member in the first internal space;
a plurality of fins that protrude rearward from the support member, the fins each having a plate-like shape extending in a first direction on a predetermined plane that is in parallel with a rear face of the support member, the fins being arranged in a second direction on the predetermined plane that perpendicularly intersects with the first direction;
a light source in the first internal space and supported by a front face of the support member, the light source emitting light forward with respect to the support member; and
a fan in the second internal space and that cools the light source by generating an air flow on a surface of the support member, the fan being disposed rearward of the support member, at a position facing the support member via the opening.

2. The floodlight according to claim 1, wherein
the support member includes
a control board that has a driving circuit for driving the light source and supports the light source, and
a heat-radiating member that is in contact with the control board, and
the fan generates an air flow on a surface of the heat-radiating member.

3. The floodlight according to claim 2, wherein
the light source is disposed on a front face of the control board,
the heat-radiating member is disposed rearward of the control board, in a manner to be in contact with the control board, and
the fan is disposed at a position facing the heat-radiating member.

4. The floodlight according to claim 3, wherein
the heat-radiating member includes a support panel that is in contact with the control board,
the fins are supported on a rear face of the support panel and protrudes rearward from the support panel,
each of the fins has a through hole that penetrates in the second direction, and
the first vents are provided on one side and on another side of the fins in the first direction, and are provided on one side and on another side of the fins in the second direction.

5. The floodlight according to claim 1, further comprising:
a temperature sensor that detects a temperature of the support member; and
a fan control unit that controls driving of the fan based on a detection signal from the temperature sensor.

6. The floodlight according to claim 5, wherein the fan control unit drives the fan when the temperature of the support member is equal to or higher than a temperature threshold, and stops the fan when the temperature of the support member is lower than the temperature threshold.

7. The floodlight according to claim 1, further comprising:
an operation device that is operated to adjust a light emission state of the light source;

a light emission state control unit that controls the light emission state based on an amount by which the operation device is operated; and a fan control unit that controls driving of the fan based on the amount by which the operation device is operated.

8. The floodlight according to claim 1, further comprising a battery mounting unit on which an electric-tool battery is mounted, wherein the light source and the fan are driven by power supplied from the electric-tool battery.

9. The floodlight according to claim 1, wherein at least a part of the support member is exposed via the one or more first vents, the one or more first vents are provided on a first side face of the housing, and the second vent is provided on a second side face of the housing.

10. A floodlight comprising:

a support member;

a light source that is supported on a front face of the support member and emits light forward with respect to the support member;

a fan that cools the light source by generating an air flow on a surface of the support member, the fan being disposed rearward of the support member, at a position facing the support member;

a main-body member that includes a housing supporting the light source and the support member;

an arm that is coupled to a coupling mechanism provided to a side face of the main-body member and is pivotable about a rotational axis; and an operation device that is disposed in the coupling mechanism, and is operated to adjusts a light emission state of the light source, the coupling mechanism including a first coupling mechanism that is provided to a first side face of the main-body member, and a second coupling mechanism that is provided to a second side face of the main-body member, the operation device being disposed in the first coupling mechanism.

11. The floodlight according to claim 10, wherein the second coupling mechanism includes a fastening mechanism that fastens the arm to the main-body member.

12. The floodlight according to claim 11, wherein the fastening mechanism includes a cam that restricts a pivoting movement of the arm.

13. The floodlight according to claim 10, wherein the operation device includes a switch that has at least a part thereof disposed along the rotational axis and is displaceable in a direction parallel with the rotational axis, and a dial that is disposed around the switch and is rotatable about the rotational axis.

14. The floodlight according to claim 13, further comprising a light emission state control unit that controls the light emission state based on an amount by which the operation device is operated, wherein the amount by which the operation device is operated includes an amount by which the switch is displaced, and an amount by which the dial is rotated.

15. The floodlight according to claim 14, further comprising a displacement sensor that detects the amount by which the switch is displaced, wherein the light emission state control unit includes a first light emission state control unit that controls the light emission state based on a detection signal from the displacement sensor.

16. The floodlight according to claim 15, wherein control of the light emission state, which is performed by the first light emission state control unit, includes at least one of control for causing the light source to switch between an on state, a blinking state, and an off state, and control for switching a color of light emitted from the light source.

17. The floodlight according to claim 14, further comprising a rotation sensor that detects the amount by which the dial is rotated, wherein the light emission state control unit includes a second light emission state control unit that controls the light emission state based on a detection signal from the rotation sensor.

18. The floodlight according to claim 17, wherein control of the light emission state, which is performed by the second light emission state control unit, includes control of illuminance on a predetermined illuminance reference surface irradiated with light emitted from the light source.

19. The floodlight according to claim 18, further comprising a storage unit that stores therein the illuminance controlled by the second light emission state control unit, wherein the second light emission state control unit controls, when the light source having been off is to be turned on, the light source in such a manner that light is emitted at an illuminance stored in the storage unit when the light source is off.

20. The floodlight according to claim 14, further comprising a battery mounting unit that is provided to the main-body member and on which a battery is mounted, wherein the light emission state control unit controls the light emission state based on remaining charge in the battery that is mounted on the battery mounting unit.

21. A floodlight comprising:

a heat-radiating member;

a light emitter unit including a light source and a control board that supports the light source, the light source being supported on a front face of the heat-radiating member and emits light forward with respect to the heat-radiating member;

a fan that cools the light source by generating an air flow on a surface of the support member, the fan being disposed rearward of the heat-radiating member, at a position facing the heat-radiating member;

a housing that has an internal space in which the light emitter unit, the heat-radiating member, and the fan are housed, the housing including vents that connect an internal space to an external space of the housing, at least a part of the heat-radiating member being exposed via the vents, the vents including a first vent on a first side face of the housing, and a second vent on a second side face of the housing; and a plurality of fins on the heat-radiating member, the heat-radiating member being in contact with the control board, the fins each having a plate-like shape extending in a first direction on a predetermined plane that is in parallel with a rear face of the heat-radiating, the fins being arranged in a second direction on the predetermined plane that intersects perpendicularly with the first direction.

22. The floodlight according to claim 21, wherein
the first side face is a top face of the housing, and
the second side face is a bottom face of the housing.

23. The floodlight according to claim 22, wherein
the housing includes a third side face and a fourth side face,
the third side face is a left face of the housing,
the fourth side face is a right face of the housing,
the vents includes a third vent provided on the third side face, and a fourth vent provided on the fourth side face, and
the heat-radiating member is exposed via the first vent, the second vent, the third vent, and the fourth vent.

24. The floodlight according to claim 23, wherein
the heat-radiating member includes a support panel that supports the control board,
the fins protrude from the support panel, and
the fins each have a through hole.

25. The floodlight according to claim 24, wherein
the fins each have a plate-like shape extending in an up-and-down direction, and are provided with a space therebetween in a left-and-right direction,
the though holes penetrate through the fins in the left-and-right direction,
the first vent is provided on an upper side of the fins,
the second vent is provided on a lower side of the fins,
the third vent is provided on a left side of the fins, and
the fourth vent is provided on a right side of the fins.

26. The floodlight according to claim 25, wherein
the internal space of the housing is partitioned by a wall into a first internal space in which the light emitter unit and the heat-radiating member are housed, and a second internal space in which the fan is housed,
the wall has an opening that connects the first internal space and the second internal space, and
the fan faces the heat-radiating member via the opening.

* * * * *